Feb. 13, 1962   B. A. RUNDE ET AL   3,021,053
ACCOUNTING MACHINES

Filed July 18, 1955   15 Sheets-Sheet 1

INVENTORS.
BYRON A. RUNDE
BY IRVIN W. BORUTZKE

*Fidler, Crouse & Beardsley*
ATTORNEYS

INVENTORS.
BYRON A. RUNDE
BY IRVIN W. BORUTZKE

Fidler, Crouse & Beardsley
ATTORNEYS

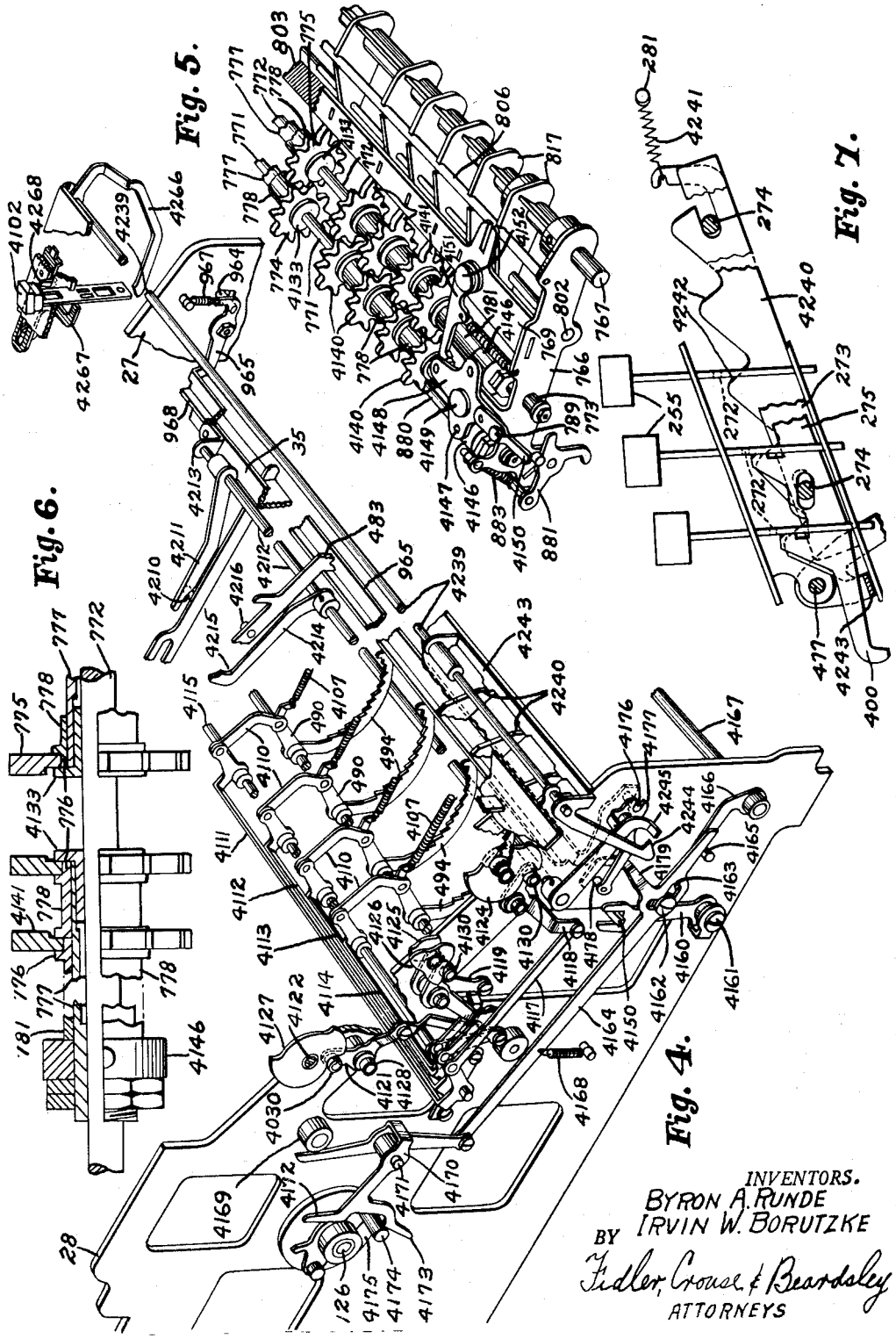

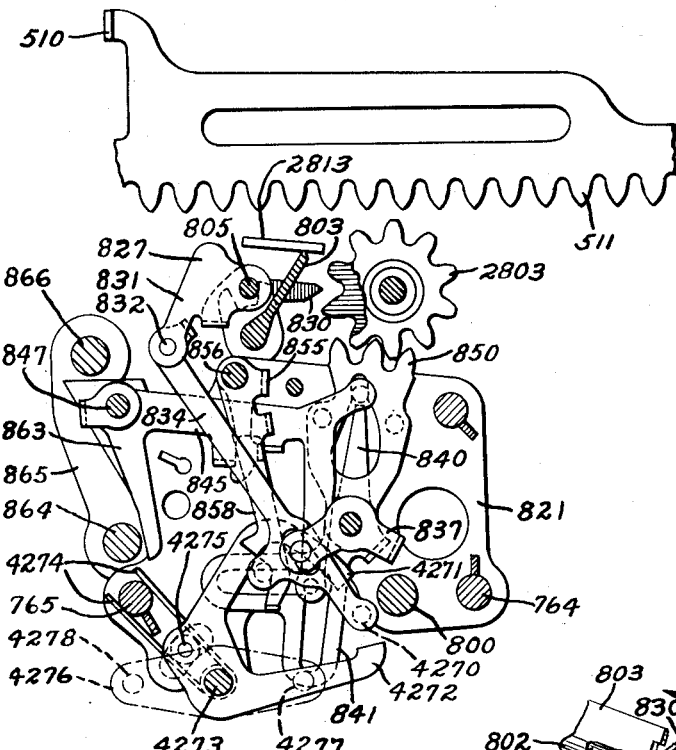
Fig. 9.
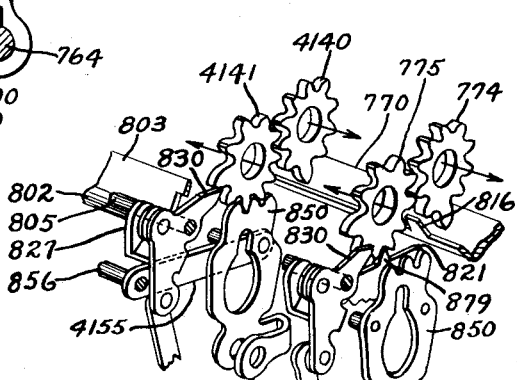
Fig. 8.
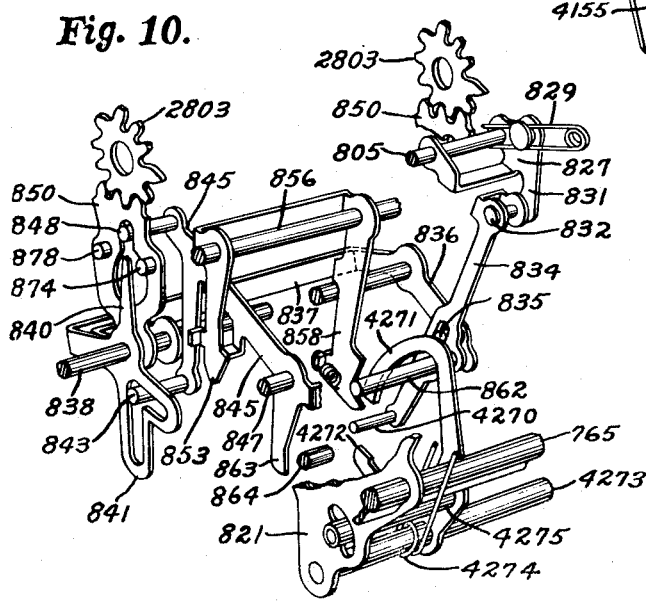
Fig. 10.
INVENTORS.
BYRON A. RUNDE
IRVIN W. BORUTZKE
BY
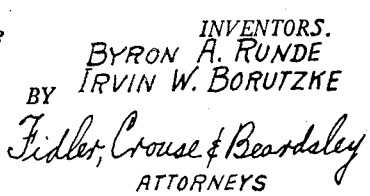
ATTORNEYS

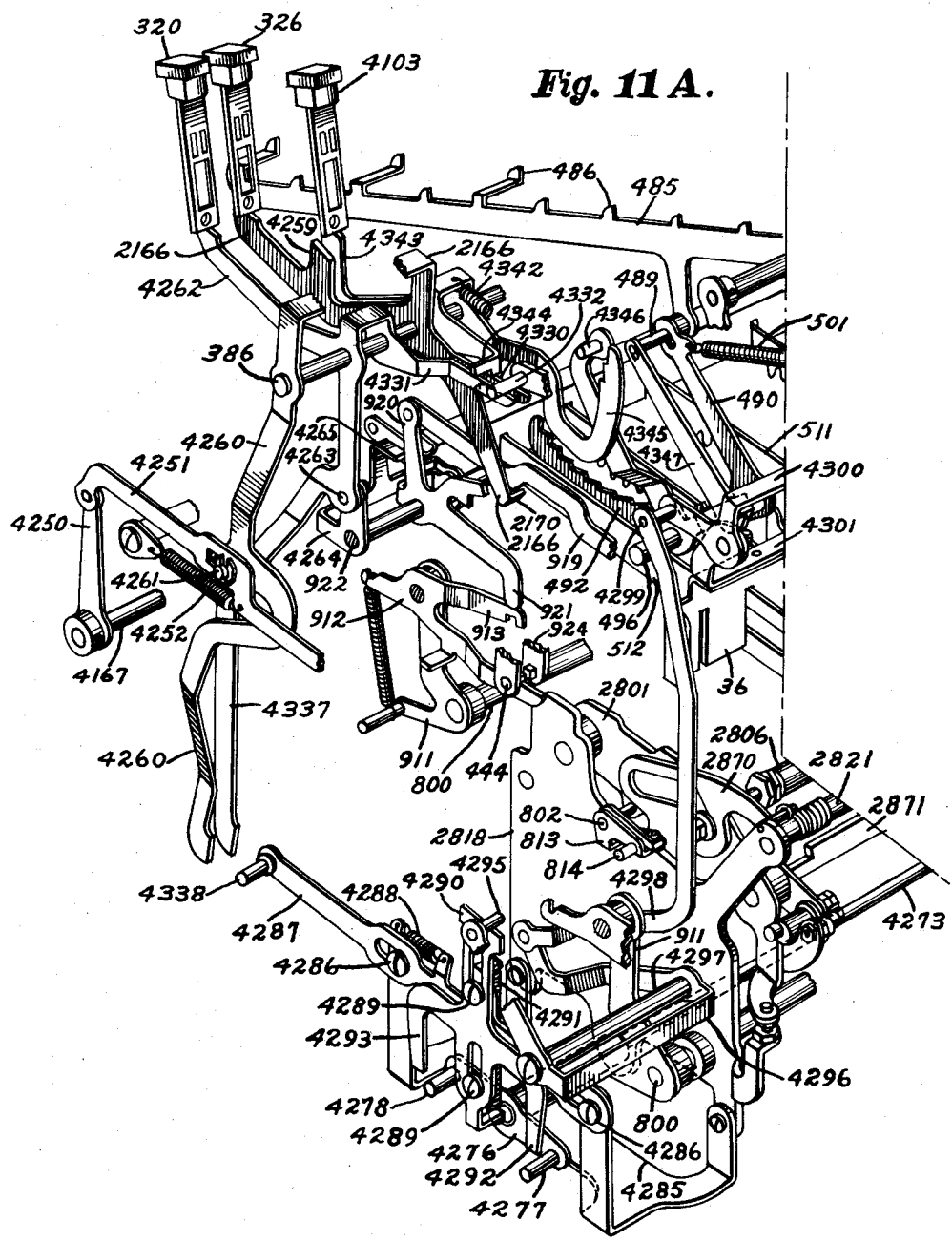

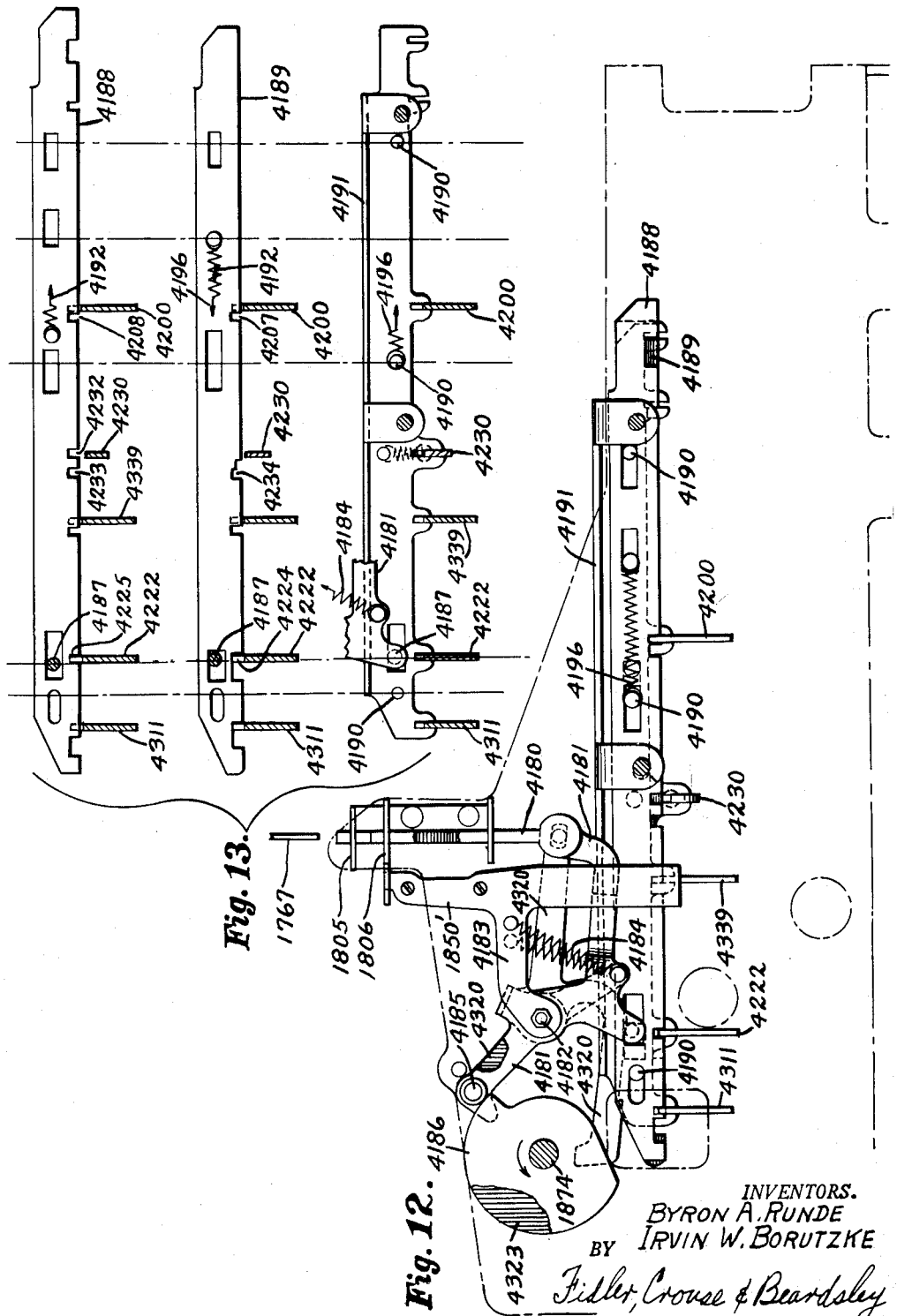

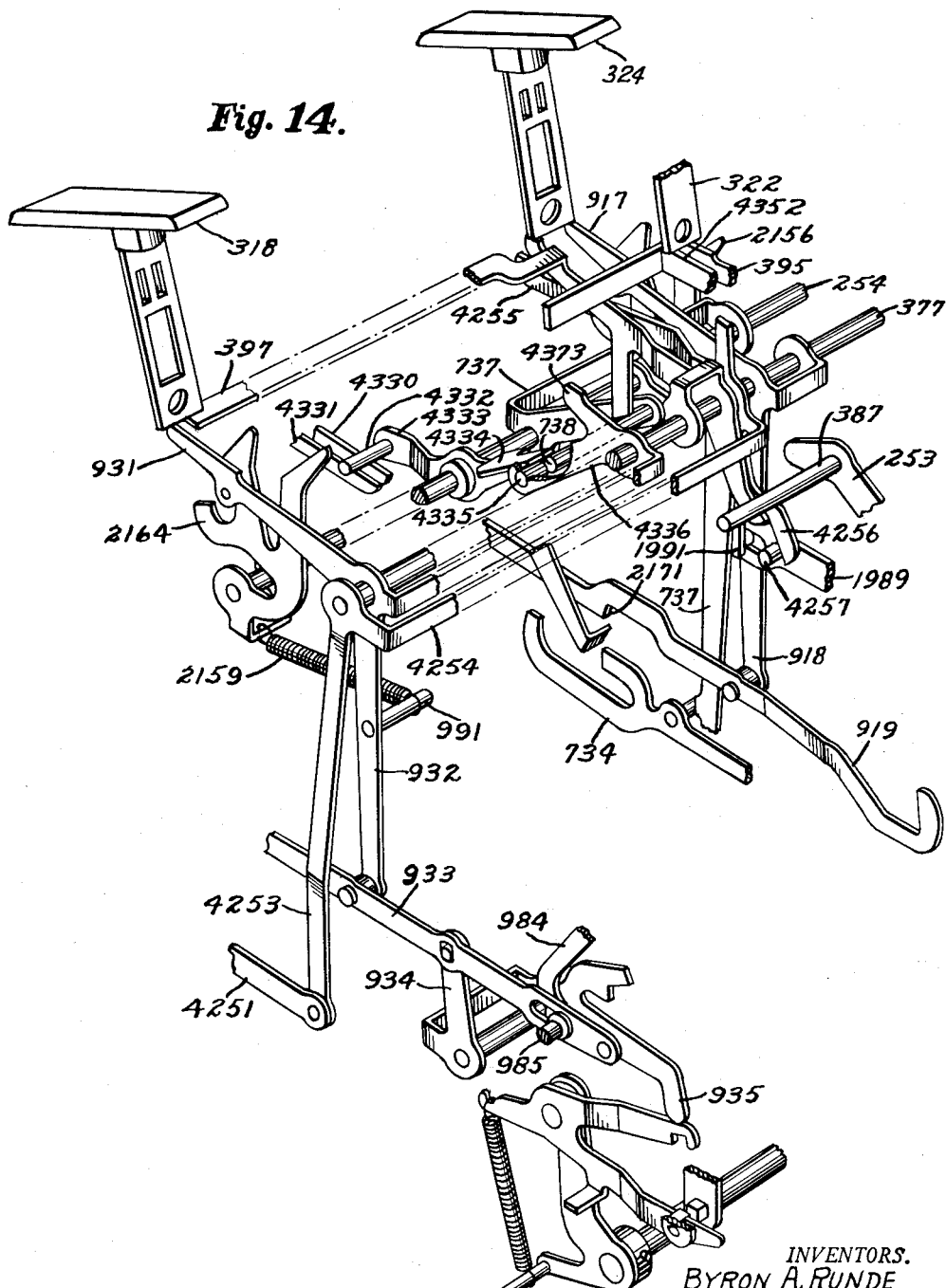

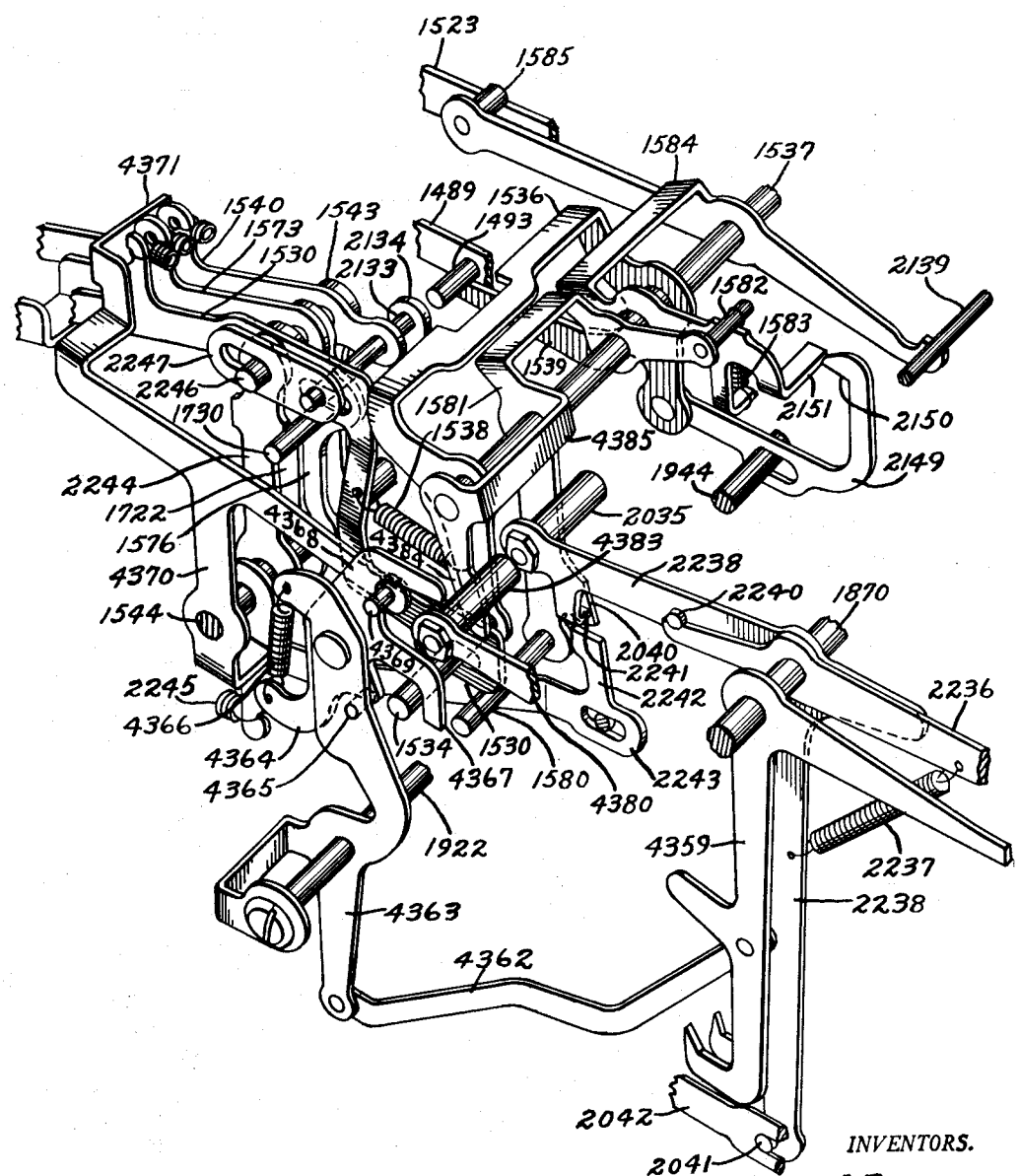

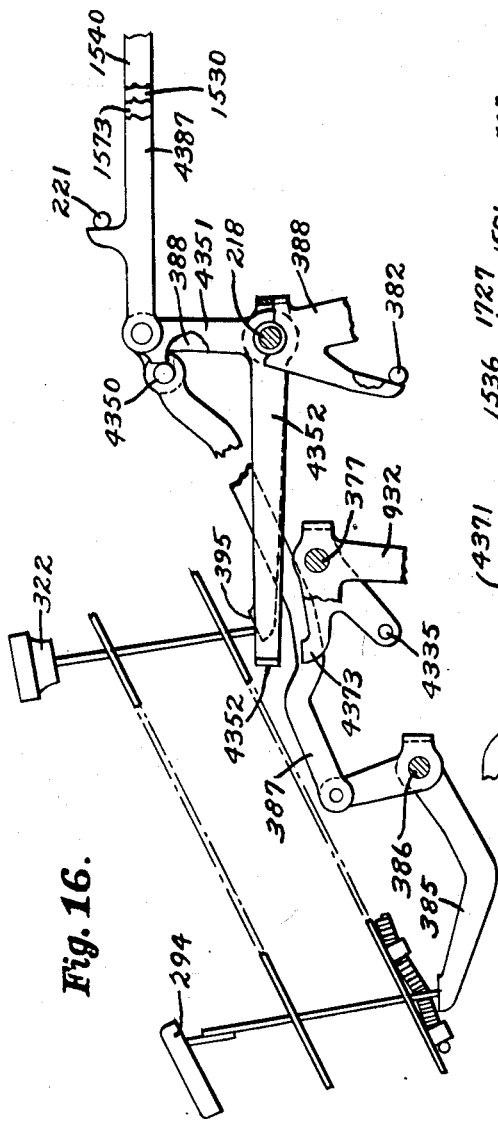
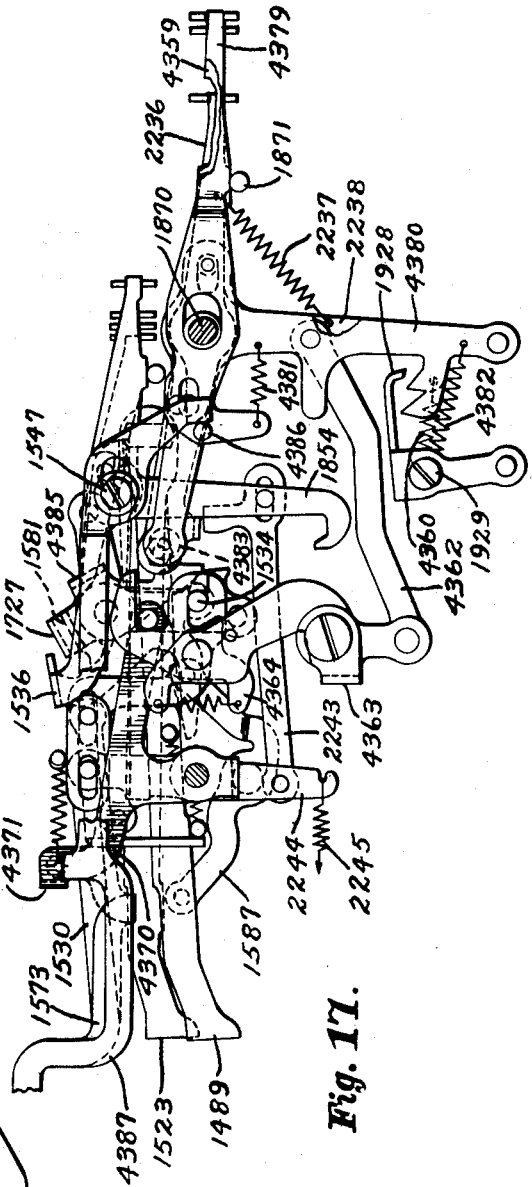
Fig. 16.
Fig. 17.
INVENTORS.
BYRON A. RUNDE
IRVIN W. BORUTZKE
BY
Fidler, Crouse & Beardsley
ATTORNEYS

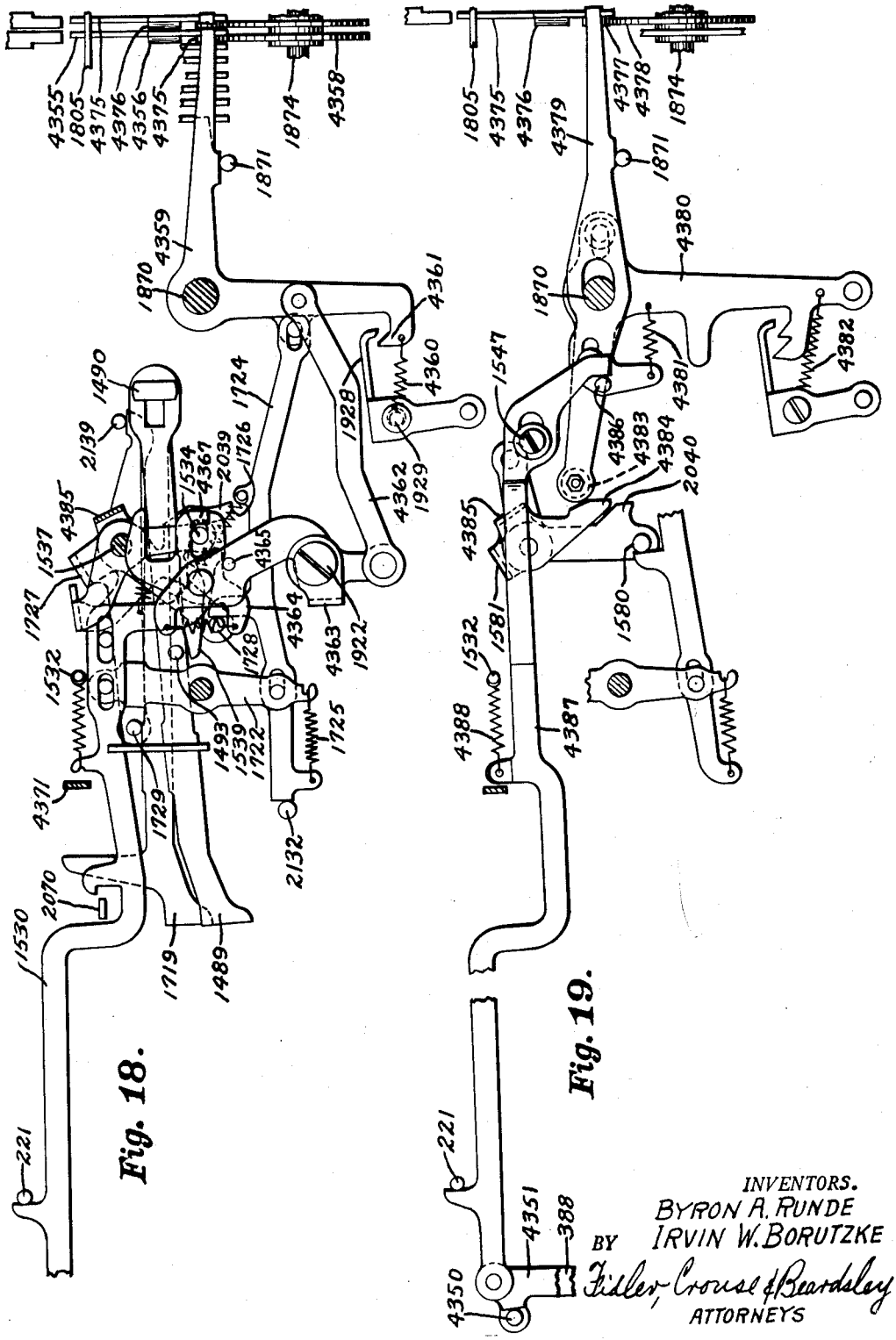

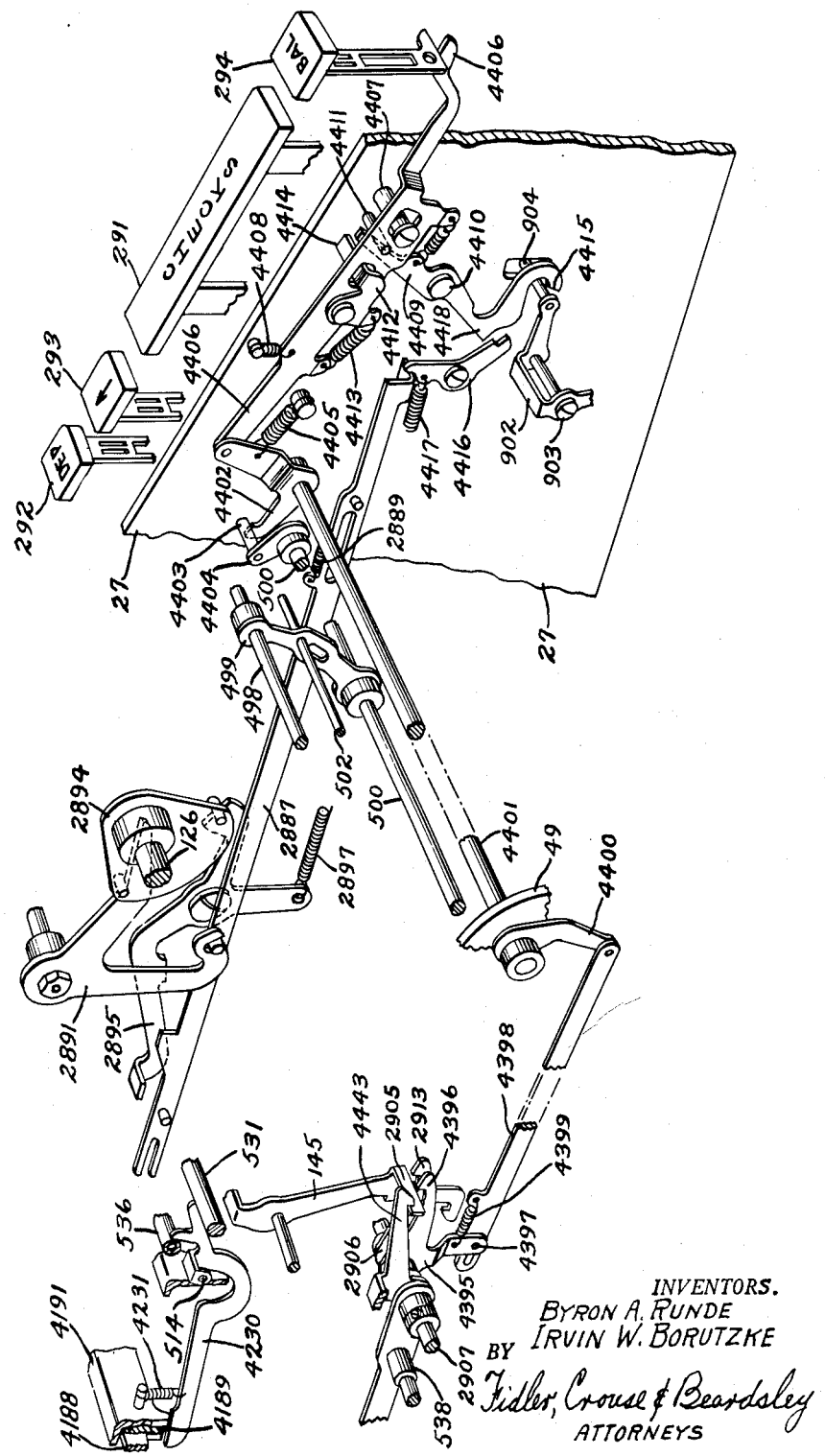

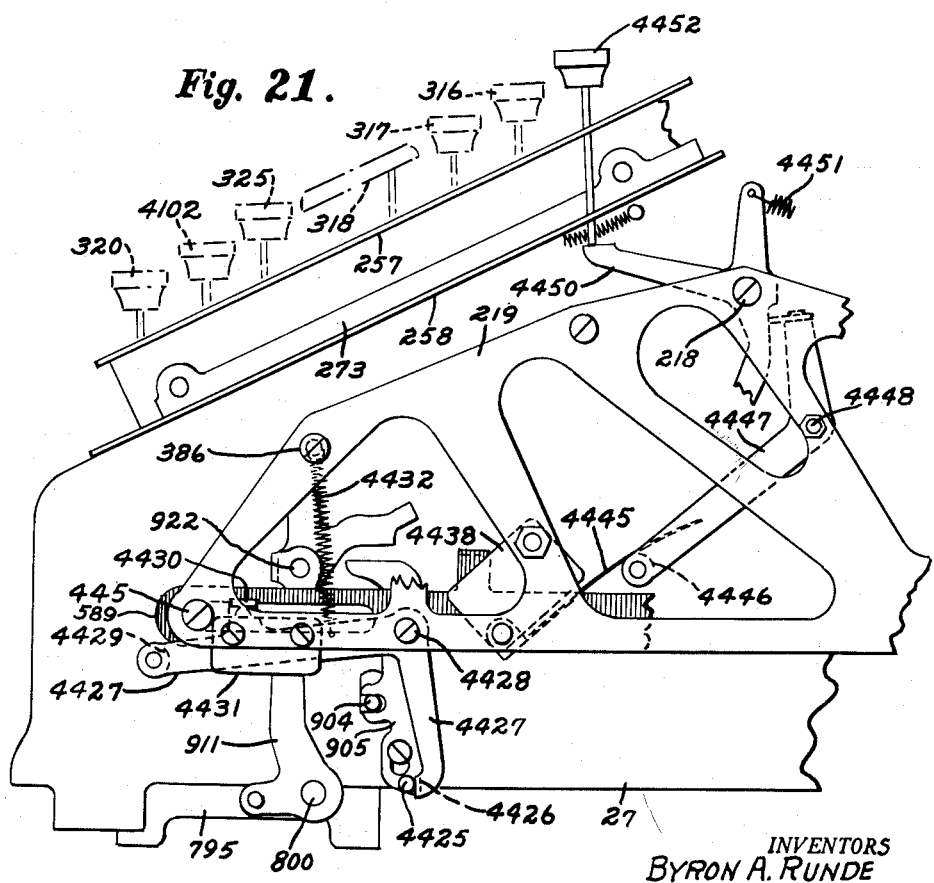

Feb. 13, 1962 B. A. RUNDE ET AL 3,021,053
ACCOUNTING MACHINES

Filed July 18, 1955 15 Sheets-Sheet 14

INVENTORS
BYRON A. RUNDE
BY IRVIN W. BORUTZKE

Fidler, Crouse & Beardsley
ATTORNEYS

Feb. 13, 1962   B. A. RUNDE ET AL   3,021,053
ACCOUNTING MACHINES
Filed July 18, 1955   15 Sheets-Sheet 15
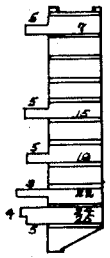
INVENTORS
BYRON A. RUNDE
IRVIN W. BORUTZKE
BY
ATTORNEYS

United States Patent Office 3,021,053
Patented Feb. 13, 1962

3,021,053
ACCOUNTING MACHINES
Byron A. Runde, Farmington, and Irvin William Borutzke, Detroit, Mich., assignors to Burroughs Corporation, Detroit, Mich., a corporation of Michigan
Filed July 18, 1955, Ser. No. 522,430
18 Claims. (Cl. 235—60)

This invention relates to improvements in accounting machines, more particularly machines intended for performing certain kinds of accounting work, such as, for example, the posting of checking accounts in banks, wherein it is necessary or desirable to keep accurate counts of items of one or more kinds and wherein it is necessary to count and to make corrections of counts of items of either algebraic sign, that is, debit or credit items. The invention is concerned more particularly with machines in which counts are accumulated in portions or sections of the same adding and subtracting totalizers or computing registers, in other portions or sections of which the amounts of the counted items are entered for computing balances of accounts and/or for accumulating totals of amounts of certain classes of items in order to avoid the provision of other adding and subtracting counters or registers solely for counting purposes.

As is well understood in the art, a totalizer having totalizer pinions for $x$ numerical orders may be used to accumulate a total of not more than $n$ digits on the pinions of the $n$ lowest orders ($n$ being less than $x$) while also accumulating a total of not more than $x-n$ digits on the pinions of the $x-n$ higher orders. To facilitate such use of a totalizer, or of each of a plurality of totalizers, the means for causing the printing mechanism automatically to print ciphers in orders in which no significant digit is printed and which are to the right of (of lower order than) the highest order in which a significant digit is printed is interrupted between the order $n$ and the order $n+1$ either permanently or by electively operable means so that the items and totals accumulated in the two sections comprising the $n$ lowest order and the $x-n$ highest order pinions may be printed without unnecessary and confusing ciphers. Also, when there is any prospect that a total of more than $n$ digits may be accumulated in the totalizer section containing the $n$ lowest order pinions, and in any case when the latter section may accumulate a negative total, it is customary to break or interrupt the transfer mechanism of the totalizer between the two sections either permanently or by electively operable means, the latter means being sometimes operable by the same control member which operates the means to interrupt the cipher printing control. Thus, although the two sections of the one totalizer structure function as separate totalizers in the limited sense that the two sections can accumulate two separate totals which need not be related in any way, still they are operable only as two sections of a single totalizer structure having all the totalizer pinions carried by a common pinion support movable by a common totalizer engaging and disengaging means alternately into and out of engagement with the differential actuators with the same timing for all of the pinions of both sections. That, as distinguished from structurally independent totalizers each having its own structurally independent pinion supporting means independently movable by separate totalizer engaging and disengaging means, is what is meant by references in the following description and claims to a totalizer having two sections, namely, an amount section and a count section. While the structurally separate and independent totalizers have certain advantages, such as complete independence of operation, over the two section totalizer construction, and do not present any special problems with respect to the additive and subtractive accumulations of counts in one of the two totalizers irrespective of the additive and subtractive accumulation of amounts in the other of the two totalizers, the two section totalizer construction has certain other advantages such as greater compactness and lower cost resulting in part from the need for fewer totalizer engaging mechanisms but does present special problems with respect to additive accumulation and subtractive correction or reduction of counts in the count section related to additive and subtractive amounts accumulated in the amount section because the pinions of both sections are engaged with and disengaged from their respective differential actuators at the same time by their common supporting means and common engaging and disengaging mechanism. That problem, among others, is solved by the present invention.

An object of the invention is to provide a machine of that kind with means enabling counting operations and corrections of counts to be effected by direct entry of counts and corrections rather than by entry of the complements of counts or corrections.

A further object is to provide a machine of that kind with means permitting both a true count total and a true amount total or account balance to be taken in the same cycle of operation of the machine regardless of the algebraic signs of the amount total or balance.

A further object is to render all the necessary controls of the counting mechanism as fully automatic as possible.

A preferred embodiment of the invention is shown in the accompanying drawings in which:

FIG. 4 shows some of the counting controls and also shows portions of the date differential mechanism in spread perspective;

FIG. 5 is a perspective view of the counting section of the crossfooter;

FIG. 6 is a detail of a portion of FIG. 5;

FIG. 7 is a partial vertical section of a count key row of the keyboard;

FIG. 8 is a perspective of portions of the tens-transfer mechanism associated with the highest amount order and lowest count order of the crossfooter;

FIGS. 9 and 10 are, respectively, a right side elevation and a spread perspective of count entering means associated with the count sections of the multiple register unit of the machine;

FIGS. 11A and 11B are two complementary parts of a spread perspective showing portions of the amount and count differential actuator mechanisms, portions of the crossfooter and multiple register function controls, portions of the automatic count controls and portions of the count and amount correction controls;

FIG. 12 is a rear elevation of portions of the automatic count control means;

FIG. 13 is a somewhat schematic illustration of an assembly of control slides of the automatic count control means;

FIG. 14 is a spread perspective of portions of the count, carriage movement and register function controls associated with the crossfooter subtotal key;

FIG. 15 is a spread perspective of portions of the automatic and manual carriage movement controls;

FIG. 16 is a right side elevation of portions of the carriage-movement controls associated with the crossfooter subtotal key and the lowermost motor bar and a register function control part associated with said crossfooter subtotal key;

FIG. 17 is a right side elevation of the mechanism of FIG. 15, together with a further automatic control of carriage movement and means operable by the crossfooter subtotal key to disable that automatic control;

FIGS. 18 and 19 are separate right side elevations of two of the automatic control mechanisms of FIG. 16; each with means operable by the crossfooter subtotal key to disable them;

FIG. 20 is a perspective of the crossfooter negative total lock controlled by the lowermost motor bar;

FIG. 21 is a right side elevation of portions of an overdraft warning means;

FIG. 24 shows selected illustrative posting and correction operations which are encountered in one particular kind of work which may be performed with the illustrated machine and shows schematically an automatic function control program set-up suited to that kind of work.

GENERAL

Figure 1:
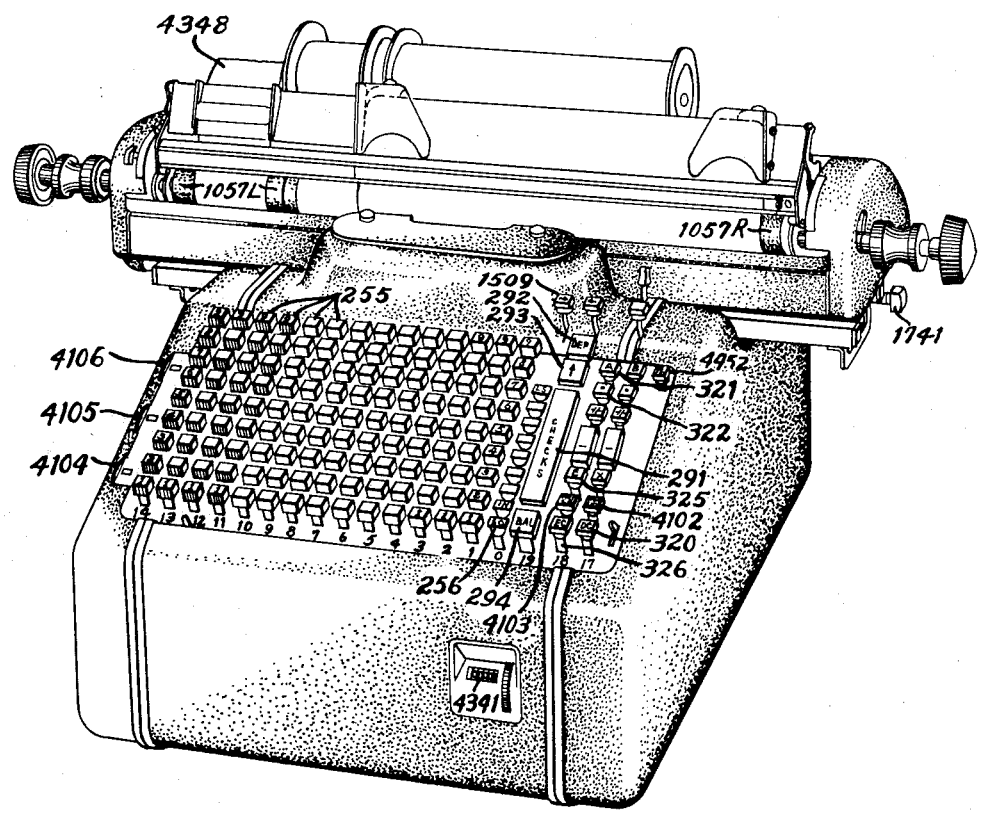
FIG. 1 is a perspective view of a machine embodying the invention.

The invention is herein disclosed as embodied, by way of example, in an accounting machine constructed as disclosed in Patent No. 2,629,549, issued February 24, 1953, to Thomas M. Butler and hereinafter referred to as "the Butler patent", with the modifications disclosed in application Serial No. 242,623 (now Patent No. 2,807,-412), filed August 20, 1951, by Byron A. Runde and hereinafter referred to as "the Runde application", and with further modifications explained more particularly hereinafter.

Those elements of the illustrated machine which are disclosed in prior patents or applications are designated in the following description and accompanying drawings by the same reference numbers by which they are identified in such prior patents and applications. Reference n numbers in parentheses identify elements disclosed in the Butler patent or Runde application but not shown in the annexed drawings. Mechanisms, parts and elements newly disclosed herein are designated by reference numbers above 4100.

Consistently with the descriptions in the above-mentioned Butler patent and Runde application, the terms "clockwise" and "counterclockwise" will be applied to rotary or swinging movements of parts as viewed from the front, top, or right side of the machine, and the terms "forward", "rearward", "rightward", "leftward", "upward" and "downward" will be applied to movements or positions of the parts as viewed normally from the front of the machine.

The keyboard of the present machine is like the keyboard of the machine of the Butler patent and Runde application except that a row "0" of nine designation keys 256 (FIG. 1) with shortened or 12-pitch spacing has been added between the motor bar row 19 and the lowest order row 1 of amount keys, a key 4102 or 4103 has been added in each of the register and crossfooter function control key rows 17 and 18 next rearward of the first key 320 or 326, respectively, at the front of each of said rows, and the three twelve-key rows 13, 14—15, and 16 of date and character keys 256 have been replaced by three more nine-key rows 12, 13 and 14 of digit keys 255 providing a total of fourteen rows each containing nine digit keys 255. The leftmost four rows 11, 12, 13 and 14 of digit keys 255 of the present machine are employed for item count purposes and only the rightward ten rows 1–10 of digit keys 255 are employed for item amount entering purposes as explained hereinafter.

In the present machine, indexing of the four date printing type bars 562 (FIG. 2) is controlled by three manually settable dials 4104, 4105 and 4106 (FIGS. 1 and 3) as explained hereinafter.

The key latching, locking and releasing mechanism (not shown) for the fourteen rows of digit keys 255 is essentially like that for the eleven rows of digit keys in the machine of the Butler patent.

The key latch slide (not shown) for the row of designation keys 256, except for difference in location of its key latch hooks required by the location of the designation keys in the first nine positions starting from the front of the designation key-row space instead of in the last nine positions ending at the rear of the key row like the nine designation character keys of the Butler patent, is like the designation key latch slide (288) for the designation keys of the key row 13 of that patent and is correspondingly operated and controlled.

The latching, releasing and interlock means associated with the row 19 of motor bars and the two rows 17 and 18 of function control keys are substantially the same as disclosed in the Butler patent and Runde application except for the necessary alterations and additions required to the key latch and interlock slides (329, 330 and 348) by the insertion of the additional control key 4102 and 4103, respectively, in each of the rows 17 and 18 of control keys, and is correspondingly operated and controlled.

Figure 11B:
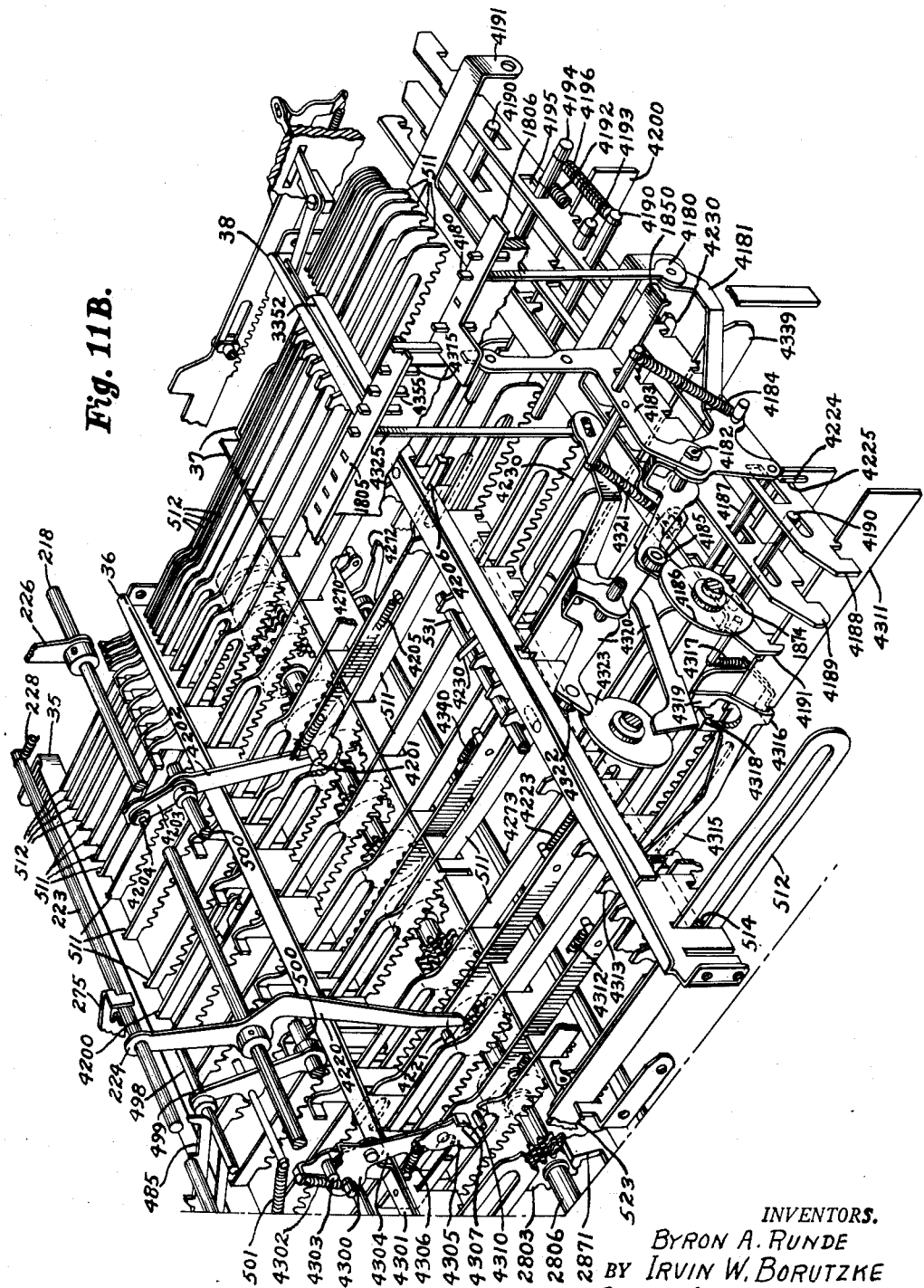

The designation keys 256 of the row "0" control a thirteen-pitch differential stop slide 485 (FIG. 11A) which is like that of the month key row 16 of the Butler patent and which operates a similar stop sector 492. The stop sector 492 controls a differential actuator slide 512 which is like each of the four slides 512 of the Butler patent and is similarly operated and controlled.

Figures 2, 3:
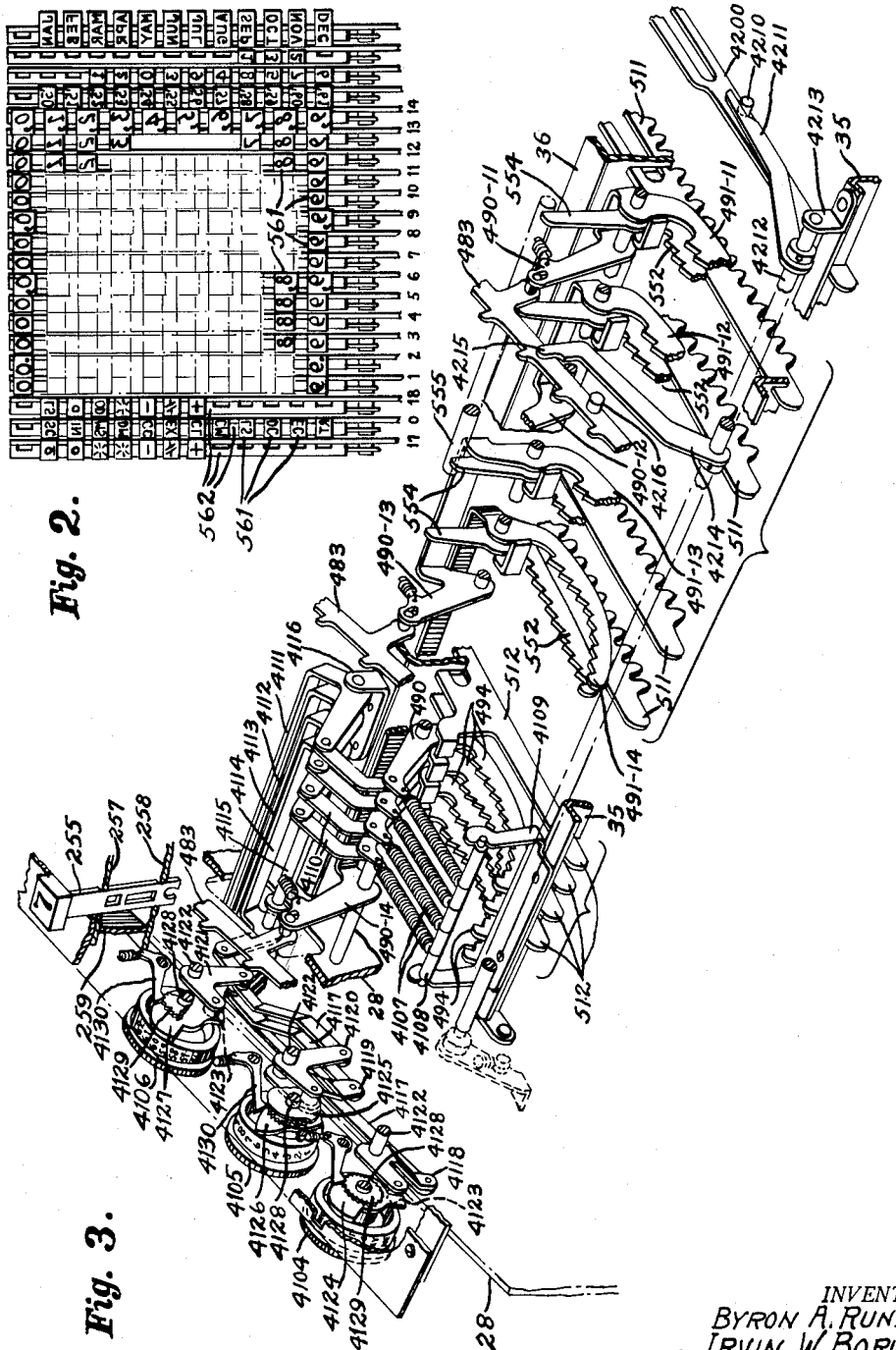
FIG. 2 is a rear elevation of the printing type bars.
FIG. 3 is a spread perspective of portions of the date and count differential mechanism.

For each of the digit key rows 1–10 there is differential stop means and differential actuator mechanism like that of the same key rows in the Butler patent including, for each row, a differential stop slide 483, stop sector (490, 491), ratchet member 552, 554 and differential actuator rack 511. The differential mechanism for the count digit key rows 11 to 14 as well as that for the amount digit key rows 1–10 functions like that of the Butler patent for the key rows 1 to 11 of that patent, but the actuator rack members 511 (FIGS. 3 and 11B) for the count key rows 11 to 14 of the present machine have been displaced rightwardly into much more closely spaced relationship so that they are located varying distances rightwardly from the associated count key rows. Accordingly, as shown in FIG. 3, each of the stop sectors 491 for the orders 11 to 14 has a yoke portion of different suitable length connecting its shouldered actuator controlling sector arm and its arm 490 connected to and located approximately in alignment with the stop slide 483 for the respective count key row.

The four actuator slides 512 for the four date orders (months, days tens, days units and years) are like the actuator slides 512 of the Butler patent and are similarly operated. Each is controlled by one of four twelve-pitch stop sectors 494 like that one for the days units key of the Butler patent except that each has a short hub instead of a short yoke portion mounted on the shaft 496. Each date stop sector 494 is constantly urged counterclockwise by a tension spring 4107 connected between its arm 490 and a rod 4108 supported by a bracket 4109 secured to the cross member 35. The arm 490 of each stop sector 494 is connected by a link 4110 to the right side arm of a respective one of four yoke members 4111, 4112, 4113 and 4114 rockably mounted in nested relation on a shaft 4115 supported at its ends in the left side plate 28 and in a small bracket 4116 secured to the top of the cross brace and actuator guide comb 36. Each of those yokes has a left side arm connected by a link 4117 with a downward arm of a respective one of four bell cranks 4118, 4119, 4120 and 4121 rockably supported on studs 4122 projecting leftwardly from the frame side plate 28. Each bell crank has a forward arm carrying a roller 4123 cooperating with a respective one of four rotatable cam plates 4124, 4125, 4126 and 4127. The cam plate 4124 is secured to the months dial 4104 and rotatable with the latter on a stud 4128 extending leftwardly from the leftmost spacing plate 259 of the keyboard. The cam plates 4125 and 4126 are both secured to the days dial 4105 and rotatable with the latter on a second similar stud 4128. The cam plate 4127 is secured to and rotatable with the years dial 4106 on a third stud 4128. There is also secured to each date dial a notched detent disk 4129 engaged by a respective one of three spring-biased detent levers 4130 pivotally supported on studs 4131 extending leftwardly from leftmost plate 259. The four date stop sectors 494 are continuously in adjusted positions determined by the settings of the three date dials 4104, 4105 and 4106.

The printing mechanism of the present machine is like that of the Butler patent except that it comprises a larger number of orders. It has twenty-one type bars 562 including, from left to right (right to left as viewed from the rear in FIG. 2), a month type bar, a days tens type bar, a days units type bar, and a years type bar, four count type bars, ten amount type bars, a crossfooter function symbol type bar, a designation character type bar and a register function symbol type bar.

Each of the five actuator slides 512 and fourteen actuator rack slides 511 carries a rack slide 523 (FIG. 11B) which, through individual gear trains (not shown) essentially like those disclosed in the Butler patent, indexes a respective one of the four date, one designation character, four count and ten amount type bars. The crossfooter and register function symbol type bars are indexed automatically under control of the crossfooter and register function controls in generally the same manner as disclosed in the Butler patent.

The paper carriage (FIG. 1) is substantially like that of the Butler patent except that the platen 1057 is split to provide a short left section 1057L which is intended to support a tally strip and is rotatable for line-spacing independently of the main right hand section 1057R.

The front crossfooter has been modified as described in detail hereinafter and the rear crossfooter of the Butler patent has been replaced by a four-register multiple register unit as disclosed in the Runde application but embodying certain modifications disclosed in detail hereinafter.

The manual and automatic function controls of the machine are like those of the Butler patent modified as disclosed in the Runde application and further modified as described in detail hereinafter.

CROSSFOOTER WITH COUNTING SECTION (FIGS. 5, 6, AND 8)

Whereas the crossfooter shown in the Butler patent comprises twelve amount orders, the crossfooter of the present invention has a right hand ten-order amount section including ten pairs of meshed pinions 774 and 775 for cooperation with the right hand ten actuator racks 511 and a left hand four-order count section comprising four pairs of meshed pinions 4140 and 4141 for cooperation wtih the left hand four actuator racks 511. The tens-transfer and "fugitive 1" mechanisms for the ten-order amount section are like those of the twelve-order crossfooter of the Butler patent except for the reduction of the number of orders by two, the "fugitive 1" entering means associated with the lowest-order amount pinion 775 being herein controlled from the tenth-order amount pinion 775 in the same manner as they are controlled from the twelfth-order pinion 775 in the crossfooter of the Butler patent and by similar means. The present machine also includes the means disclosed in the Butler patent and connected with the "fugitive 1" mechanism to condition the amount section of the present crossfooter automatically to yield a true negative total whenever the machine is operated to take a total from the crossfooter while it contains an overdraft. The present machine also contains the mechanism disclosed in the Butler patent which, when the machine is operated with the paper carriage in a columnar position in which a #5 control projection is provided in a control lane 16 and a negative total is taken from the front or A crossfooter, will automatically condition the rear or B computing mechanism (herein comprising a four register multiple register unit as in the Runde application) for subtractive accumulation of such negative total. It should be noted that, as in the Butler patent, the amount pinions 775 of the forward line cooperate directly with their respective amount actuator racks 511 in addition, subtraction and positive total-taking and that the rear line of amount pinions 774 engage the actuator racks only in negative total-taking.

The amount pinions 774 and 775 are mounted on end portions 776 of double-flanged sleeves 778 on two tubes 777 slidable endwise in opposite directions on rods 771 and 772 to position either the pinions 775 or 774 in alignment with the amount actuator racks while always maintaining the pairs of pinions 774 and 775 for respective orders in mesh, the separate bearing sleeve 776 and spacing sleeve 778 of the Butler patent being now formed unitarily. The tubes 777 of the present construction are shortened and each has a flanged bushing fixed in its left end to maintain the tenth order pinions 774 and 775 in proper axial position. The pinions 774 and 775 shown at the right in FIGS. 5, 6 and 8 are the tenth order amount pinions.

On the rods 771 and 772 leftward the ten-order lines of amount pinions 774 and 775 there are a pair of similarly assembled and mounted four order lines of counting pinions 4140 and 4141, each rotatably mounted on a double flanged sleeve 778 assembled on tubes 777 having flanged bushings 4133 fixed in their rightward ends to retain the lowest order pinions 4140 and 4141 on their bearing sleeves 778, the sleeves 778 and an enlarged collar 4146 on each tube being held tightly between the flanges on the bushings 4133 and nuts threaded on the left end of the tube. Each of the collars 4146 has a radial bore receiving the lower end of a respective one of two studs 4147 secured in the forward and rearward arms, respectively, of a four-armed lever 4148 pivoted on a stud 4149 secured in an ear extending rightwardly from the upper edge of the left end plate 766. By means of an arm 4150 adjustably secured to the leftward arm of the lever 4148, the two short lines of counting pinions 4140 and 4141 may be cross-shifted in opposite directions to align either the pinions 4140 or the pinions 4141 with the four counting actuator racks 511 while always keeping each counting pinion 4140 meshed with the pinion 4141 of the same order. A spring-biased detent lever 4151 pivoted on a stud 4152 secured in the spacing strip 769 cooperates with a stud projecting downwardly from the rightward arm of the lever 4148 yieldingly to retain the lines of counting pinions against accidental cross-shifting.

The four-order counting section of the crossfooter has tens-transfer mechanism which is like that provided for the first four orders of the amount section except for the differences next described. The transfer segments 850 for the count section mesh only with the forward count pinions 4141 and are moved in the same manner as the transfer segments 850 of the amount section forwardly from normal position for additive transfers or carries, and rearwardly from normal position for subtract transfers or borrows, the diection of movement forwardly or rearwardly from normal position being determined automatically by the transfer tripping movement of the transfer pawls 830 upwardly or downwardly by the adding or subtracting clockwise or counterclockwise movement of the pinions of the forward line, whereas in the amount section the transfer pawls 830 and transfer segments 850 are so located that the forward pinions 775 are aligned for cooperation with them only when said pinions are in their rightward positions for addition, subtraction, or positive total taking, but not when the amount pinions are cross-shifted for negative total taking. The transfer pawls 830 and transfer segments 850 in the count section are located about a half of a pinion-width farther leftward relative to the count pinions so that those transfer pawls 830 and transfer segments 850 are cooperatively engageable by the forward count pinions 4141 in both the rightward and leftward cross-shifted position of those pinions. The partition plates 821 in the count section of the transfer mechanism are correspondingly located farther leftward relative to the count pinions.

As the forward count pinions 4141 are in mesh with their transfer segments 850 at all times when count pinions are in their lowered positions out of mesh with their actuator racks regardless of the cross-shifted positions of the forward and rearward count pinions, the transfer segments 850 alone suffice to hold the count pinions against improper accidental rotation while they are in their lowered positions. Improper accidental rotation of the count pinions while they are moving upwardly into and downwardly out of mesh with their actuator racks is prevented by the same bail 830 which prevents rotation of the amount pinions 774 and 775 during those times.

No "fugitive 1" mechanism is provided in the count section. The transfer segment 850 cooperating with the lowest order counting pinion 4141 is permanently rigidly held in central or non-transfer position by a link 4155 connected to the cross shaft 856.

The leftward end portion of the arm 4150 (FIG. 4) is embraced by the slotted upper end of a lever 4160 pivotally mounted at its lower end on a stud 4161 secured to the outer side of the left side plate 28. The lever 4160 carries a stud 4162 engaged in an L-shaped slot 4163 in a link 4164, the forward end of which rests on a stud 4165 carried by an arm 4166 secured to and extending upwardly and rearwardly from the left end of a shaft 4167 rotatably supported in the side plates 27 and 28. The forward end of the link 4164 is urged downwardly against the stud 4165 by a tension spring 4168. The rearward end of the link 4164 is pivotally connected to the downward arm of a three-armed lever 4170 pivotally mounted on a stud 4171 secured in the side plate 28. The rearward arm of the lever 4170 has an upper branch 4172 and a lower branch 4173 to cooperate with a stud 4174 carried on an arm 4175 secured on the left end of the machine cycling drive shaft 126. In the normal position of the parts, the stud 4174 engages the lower branch 4173 and holds the lever 4170 in its clockwise position and the link 4164 in its forward position where the stud 4162 is in the lower rear corner of the L-shaped slot 4163 and the levers 4160 and 4150 are held in their forward positions to hold the count pinions 4141 in alignment with the count actuator racks 511.

Early in each cycle of operation of the machine, the stud 4174 moves upwardly away from the lower branch 4173 of the rear arm of the lever 4170 and acts on the upper branch 4172 to rock the lever 4170 counterclockwise and pull the link 4164 rearwardly. A hub 4169 secured in the plate 28 a little forwardly of an upward arm of the lever 4170 prevents counterclockwise overthrow of the lever. If the forward end of the link 4164 is in its normal upper position with the horizontal branch of its L-shaped slot 4163 aligned with the stud 4162, the rearward movement of the link 4164 does not rock the lever 4160 and arm 4150 and the counting pinions 4141 remain aligned with their actuator racks 511. If, however, the shaft 4167 and arm 4166 have been rocked clockwise from their normal position, in a manner hereinafter described, to lower the stud 4165 and permit the spring 4168 to lower the forward end of the link 4164 to engage the stud 4162 in the upward branch of the L-shaped slot 4163, the rearwardly moving link 4164 will pull the lever 4160 and arm 4150 rearwardly to cross-shift the count pinions so as to align the pinions 4140 with the count actuator racks 511 and move the pinions 4141 out of alignment with those racks 511 prior to the time of upward movement of the crossfooter pinion frame to engage the selected sets of amount pinions 775 or 774 and count pinions 4141 or 4140 with their respective actuator racks 511.

As disclosed in the Butler patent, in amount adding operations of the crossfooter, the pinions 775 are in mesh with their actuator racks 511 for rotation thereby only during the return movement of the racks from differential positions to normal position, but in subtracting operations the same pinions 775 are in mesh with the actuator racks only during the forward movement of the racks from normal position to differential positions. In positive total-taking, the pinions 775 are in mesh with the actuator racks, as in subtraction during the forward movement of the racks, but in negative total-taking the amount pinions are cross-shifted so that the pinions 774 are in mesh with the amount actuator racks during their forward movement. Since both the counting pinions and the amount pinions of the present crossfooter are carried by the same rods 771 and 772, the timing of the engagement with and disengagement from the respective actuator racks 511 will be the same for both the counting pinions and the amount pinions. In operations in which the front crossfooter function controls disclosed in the Butler patent cause the crossfooter pinions to mesh with and unmesh from the actuator racks in adding timing while the forward line of counting pinions 4141 are aligned with their actuator racks 511, any count values entered by the latter racks are added to the counting pinions, whereas, if the rear line of counting pinions 4140 are aligned to mesh with the count racks, those count values are subtracted from the counting pinions. When, however, the front crossfooter function controls are in subtraction condition and the front line of counting pinions 4141 mesh with their actuator racks, the count values entered thereby will be subtracted from the count pinions, but if the rear line of count pinions 4140 meshes with the actuator racks, those count values will be added. In other words, during amount entering operations of the amount section of the crossfooter, the front count pinions 4141 are meshed with the count actuators 511 for entering count values in the same algebraic sense as the entry in the amount section but the rear count pinions 4140 are meshed with the count actuators 511 to enter the count values in algebraic sense opposite that of the entry on the amount pinions.

In all total-taking or subtotal-taking operations in the present machine as in the machine of the Butler patent, the differential stop slides 433 and thus also the associated stop sectors 491 are held in their normal "9" positions by a bail which is rocked to blocking position when the computing function controls for either the front or A crossfooter or the rear or B computing mechanism, which is a multiple register unit in the present machine, is placed in total-taking or subtotal-taking condition. The blocking bail 965 (FIG. 4) in the present machine has a forward extension of its left side arm carrying a stud 4176 which extends leftwardly through a slot in the left frame plate 28 and into a slot in the forward end of a lever 4177 pivoted on a stud secured in the plate 28. The rear end of the lever 4177 carries a stud 4178 normally positioned sufficiently below the rearwardly directed upper end of an upward arm 4179 of the link 4164 so as not to interfere with downward movement of the forward end of the link 4164 with the stud 4165 in amount entering operations. However, when the bail 965 is rocked counterclockwise to blocking position for a total-taking or subtotal-taking operation, its stud 4176 rocks the lever 4177 to elevate the stud 4178 to a position to prevent the forward end of the link 4165 from moving downwardly to engage the stud 4162 in the vertical branch of the L-shaped slot 4163 and cross-shift the counting pinions of the crossfooter. Thus, when an amount total of either algebraic sign is taken from the front crossfooter, the front counting pinions 4141 are meshed with the count actuators 511 and are arrested at their "0" positions by the same blade 803 which arrests the amount pinions 775 in positive total-taking, i.e., a positive count total is obtained from the count section of the front crossfooter. Furthermore, if the front crossfooter controls are not in non-add condition while a total or subtotal is taken from a register of the rear or B multiple register unit, the count total or subtotal obtained from the hereinafter described count section of that register will be accumulated in the count section of the front or A crossfooter in the same sense algebraically as the amount total or subtotal obtained from the amount section of that register is accumulated in the amount section of the A crossfooter.

COUNTING SECTIONS OF MULTIPLE REGISTERS

Each of the four registers of the multiple register unit in the B position has fourteen pinions 2803 (FIGS. 9, 10, and 11B) and a corresponding number of orders of transfer mechanism instead of the twelve shown in the Runde application. The transfer mechanism of the multiple register unit is split between the tenth and eleventh orders by removal of the pawl finger 830 from that one of the transfer pawl yokes 827 (FIG. 10) which, before removal of the finger 830, was operable by the tenth order pinion 2803 of the active register to cause transfers to the eleventh order. The groups of multiple register pinions for the eleventh to fourteenth orders constituting the counting sections of the multiple register are placed substantially as closely adjacent the tenth order group as possible so as to match the spacing of the four counting actuator racks 511, i.e., so that when the first to tenth order amount pinions 2803 of any one of the four registers are aligned with the first to tenth order amount actuator racks 511, the eleventh to fourteenth order pinions of the same register will be aligned with the counting actuator racks. The corresponding orders of the multiple register transfer mechanism are correspondingly laterally compressed and aligned with the four counting pinions 2803 of the active register.

AUTOMATIC ITEM COUNTING IN CROSSFOOTER AND MULTIPLE REGISTER

A unit count may be entered automatically in the count section of the A crossfooter and simultaneously in the count section of the active B register in each amount entering cycle of operation initiated with the paper carriage in selected columnar positions, if no count keys 255 in rows 11, 12, 13 or 14 are depressed, and provided that none of the control keys 320, 326, 4102 or 4103 is depressed.

The carriage control of simultaneous counting in the crossfooter and register utilizes the previously unused control lane 24. A sensing pin 4180 (FIGS. 11B and 12), the upper portion of which is vertically movably guided in the lane 24 aperture in the guide plate 1806, is pivotally connected at its lower end to the leftward arm of a control lever 4181 which is pivotally mounted on a stud 4182 secured in an arm 4183 now added to the bracket 1850. The control lever is urged clockwise by a tension spring 4184 which maintains a roller stud 4185 on a rightward arm of the control lever engaged against the edge of a sensing control cam disc 4186 secured on the sensing control operating shaft 1874. The roller 4185 normally bears against the high edge portion of the cam disc 4186. The latter has steep decline or drop-off which moves under the roller 4185 during about the 15° to 55° portion of the machine cycle and an incline which restores the roller 4185 and control lever 4181 to normal during about the 115° to 162° portion of the machine cycle.

A downward arm of the lever 4181 carries a stud 4187 extending forwardly through apertures in two slides 4188 and 4189 (FIGS. 11B, 12 and 13) extending transversely of the machine and longitudinally movably guided on three studs 4190 extending rearwardly from a guide bracket 4191 secured to the front face of the machine frame back plate (45). A tension spring 4192 connected at its rightward end to a stud 4193 secured in the slide 4188 and at its leftward end to a stud 4194 secured in the slide 4189 and extending rearwardly from the latter through a laterally elongated slot 4195 in the slide 4188 urges the latter slide leftward normally to maintain the righward end of the slot 4195 engaged against the stud 4194. A second tension spring 4196 connected at its left end to the stud 4194 and at its right end to the middle stud 4190 normally yieldingly holds both slides 4189 and 4188 at their rightward limits of movement as determined by the studs 4190 and where the control stud 4187 bears against the left end of its slot in the slide 4189 but is in the midportion of its longer slot in the slide 4188.

The lower edges of both slides 4188 and 4189 are normally engaged in a short slot in the upper edge of a slide 4200 supported for forward and rearward movement on the same rods 514 as the actuator racks and slides 511 and 512 and guided in slots in the same transverse guide members 35, 36, 37 and 38 and in a slot in the lower edge of the bracket 4191. In their normal rightward positions, the slides 4188 and 4189 thus block the slide 4200 against substantial movement forward from its normal rearward position.

A stud 4201 secured in and projecting rightwardly from the slide 4200 is normally engaged by the rear edge of the lower end of a lever 4202 angularly adjustably mounted on the shaft 500 adjacent an arm 4203 secured on said shaft. An eccentrically shouldered screw 4204 passes through apertures in the arm 4203 and in the upper end of the lever 4202 and may be locked in rotarily adjusted position by a nut. The shaft 500 carries the arms 499 supporting the bail rod 498 which, as disclosed in the Butler patent, moves rearwardly to cause rearward movement of the differential stop slides 483 and 485 to differential positions relatively early in all machine cycles except when a total or subtotal is taken. A tension spring 4205, connected at its rear end to a stud in the slide 4200 and at its front end to the lever 4202, urges the stud 4201 and slide 4200 to follow the lever 4202 forwardly.

A slide 3352 mounted for movement transversely of the machine on the guide member 38 and positioned by the register selecting mechanism as disclosed in Patent No. 2,765,980, to Byron A. Runde, carries a rearwardly extending stud 4206 which, when the slide 3352 is in the position which it occupies when the #1 register of the multiple register unit is selected for operation, is located in a cut-out in the upper edge of the slide 4200 with the vertical rear edge of the cut-out very close to the rear end of the stud 4206 so as to prevent effective forward movement of the slide 4200. Adjacent the stud 4206 a wide notch in the lower edge of the slide 3352 is in line with the upper edge of the slide 4200 while any register other than the #1 register is in active position.

In a machine cycle in which a #4 control projection 1767 is located above the lane 24 sensing pin 4180, the spring 4184 is permitted to rock the lever 4181 clockwise, elevate the sensing pin 4180, and move the slide 4189 leftwardly only far enough to register a notch 4207 in the lower edge of the latter slide with the slide 4200. If the slide 4188 is not blocked as hereinafter explained, it too will move with the slide 4189 and register a notch 4208 in its lower edge with the slide 4200 so that when the lower arm of the lever 4202 is swung forwardly, the slide 4200 will move forwardly if any register other than the #1 register has been selected by the lane 25 register selection control of the Runde application and the stud 4206 has correspondingly been displaced rightwardly from the slide 4200.

The forward portion of the slide 4200, as shown in FIG. 4, carries a stud 4210 which projects rightwardly under the lower cam edge of a cam lever 4211 secured at its forward end on a shaft 4212 rotatably mounted in the frame left side plate 28 and in a small bracket 4213 mounted on the transverse guide member 35. Slightly rightward of the vertical plane of the differential stop slide 483 associated with the row 11 of keys 255, the lowest order count keys, an arm 4214 is secured at its forward end on the shaft 4212. The arm 4214 has an upwardly turned rear end portion having a shoulder 4215 which is normally just below the path of a stud 4216 secured in and projecting rightwardly from the last-mentioned differential stop slide 483.

In a machine cycle in which the slide 4200 moves forwardly as explained above, the stud 4210 cams the rear end of the lever 4211 upwardly, thus turning the shaft 4212 to elevate the rear end of the arm 4214 to place the stop shoulder 4215 thereof in the path of the stud 4216. In machine cycles other than those in which a total or a subtotal is taken, the stop slides 483 for key rows in which no key 255 is depressed move rearwardly to the fullest extent to rock the associated stop sector 491 to position to hold the actuator rack 511 for the same order in its normal "0" position. When the shoulder 4215 of the arm 4214 is in the path of the stud 4216, it arrests the rearward movement of the stop slide 483 for the lowest count order in the same position in which the latter would be arrested by the "1" key 255 of its key row, were that key in depressed position. Accordingly, the stop sector 491-11 for the lowest count order is positioned to arrest the actuator rack 511 for that order at its "1" differential position so that "1" will be entered on the pinions 4141 and 4140 of lowest order of the count section of the crossfooter if the crossfooter has not been non-added, and will simultaneously be entered on the lowest order pinion 2803 of the lowest order of the count section of the active multiple register if the multiple register unit has not been non-added.

In machine cycles in which no amount keys 255 in key rows 1–10 are depressed, the slide 4188 is latched in normal position where it locks the slide 4200 against moving forwardly to cause a unit count to be entered. As in the machine of the Butler patent, the bail rod 223 (FIG. 11B) carried by arms 224, (225) and 226 secured on the shaft 218 moves rearwardly in the initiation of each machine cycle to lock the keys 255 and moves farther rearwardly when no keys 255 are in depressed position than when at least one key is in depressed position. The arm 224 now has a downward extension 4220 the lower end of which is positioned a little rearwardly of a stud 4221 projecting rightwardly from a slide 4222 mounted for forward and rearward sliding movement on the rods 514 and guided in slots in members 36, 37 and 38. The slide 4222 is normally yieldingly held at its rearward limit by a tension spring 4223 connected at its forward end to a stud in the slide 4222 and at its rear end to the rear rod 514. The rearward movement of the bail rod 223 and forward movement of the lower end of the extension 4220 which occurs in the initiation of a machine cycle in which at least one key 255 is depressed is not sufficient to permit the extension 4220 to act on the stud 4221 to move the slide 4222 from its normal position in which a vertical slot 4224 in the upper edge of said slide near its rear end is aligned with the lower edge of the slide 4188 to permit leftward movement of the latter. However, the greater rearward movement of bail rod 223 and correspondingly greater forward movement of the extension 4220 which ocurs at the initiation of any machine cycle in which no keys 255 are depressed enables the extension 4220 to act on the stud 4221 to move the slide 4222 forwardly sufficiently to move the rear end portion of the slide 4222 rearwardly of the slot 4224 into a vertical slot 4225 in the lower edge portion of the slide 4188 and thereby lock the latter slide against movement from its normal position where it holds the slide 4200 against forward movement and so prevents the automatic entry of a count unit. The slide 4222 remains in such locking position until the bail rod 223 and the extension 4220 are restored through normal position at about the 187° point of the machine cycle by the key latch slides 275 as the latter are pulled forwardly by the key release mechanism.

In machine cycles in which no control projection 1767 is above the lane 24 sensing pin 4180, the latter is elevated and the control lever 4181 is rocked clockwise to the full extent permitted by the drop-off of the cam disk 4186 to move the slide 4189 far enough to the left to carry the notch 4207 sufficiently past its position of alignment with the slide 4200 that the slide 4189 will again lock the slide 4200. If, in the same machine cycle, at least one key 255 is in depressed position, the slide 4188 will be free to follow the slide 4189 to the full extent and likewise carry its notch 4208 past the slide 4200 and again lock the latter.

A latch means is provided to hold the slides 4188 and 4189 against movement from locking position to unlocking position relative to the slide 4200 throughout the time, beginning with the restoring movement of the lane 24 sensing control lever 4181 toward normal and the return of the shaft 500 and lever 4202 to normal, at about the 190° point of the machine cycle, during which the slide 4200 could move forward if released by the slides 4188 and 4189. A latch lever 4230 (FIGS. 11B and 20) is pivotally mounted intermediate its ends on the rear rod 514. The rear end portion of the latch lever 4230 is guided in a vertical slot in the lower edge of the front flange of the bracket 4191 and is urged upwardly by tension spring 4231 (FIG. 20) connected between said lever and a stud in the bracket. Normally, the rear end of the latch lever 4230 is held downwardly out of engagement with the slides 4188 and 4189 by engagement of an upwardly inclined front end portion of the latch lever by the differential actuator drive bail 531. When the slide 4188 is in its normal rightward position a vertical notch 4232 in its lower edge is aligned with the latch lever 4230, and when the slide 4188 is in its farthest leftward position another vertical slot 4233 in its lower edge is aligned with the latch. In the lower edge of the slide 4189 is a stepped slot 4234 comprising a shallow portion which is aligned with the latch lever 4230 when the slide 4189 is in the middle position to which it is moved in a machine cycle in which a #4 control projection 1767 is engaged by the lane 24 sensing pin 4180 and the slot 4207 permits free passage of the slide 4200. A deeper portion of the notch 4234 is aligned with the latch 4230 when the slide 4189 is moved to its leftmost position in the absence of a control projection 1767 above the sensing pin 4180.

The latch lever 4230 moves to latch the slides 4188 and 4189 as the drive bail 531, at about the 95° point in the machine cycle, starts to move forwardly from its normal rearward position and is restored to normal releasing position only as the bail 531 completes its return to its normal rearward position at about the 260° point of the machine cycle. When the slides 4188 and 4189 are both moved to their leftmost positions to lock the slide 4200 in a machine cycle in which no control projection 1767 is above the lane 24 sensing pin 4180 but at least one key 255 is depressed, the rear end of the latch lever 4230 will enter into the notch 4233 in slide 4188 and into the deeper portion of the notch 4234 in slide 4189 and prevent the slides 4188 and 4189 from restoring rightwardly as the lane 24 sensing pin 4180 and control lever 4181 are restored and thus possibly release the slide 4200 prior to the return of lever 4202 to normal position.

In a machine cycle in which at least one key 255 is depressed and the lane 24 sensing pin encounters a #4 control projection 1767 so that slides 4188 and 4189 are moved leftward to their middle positions to free the slide 4200 for forward movement, there is no need for latching of slides 4188 and 4189 by the latch 4230 and the latter engages the lower edge of slide 4188 between the notches 4232 and 4233.

In a machine cycle in which no keys 255 are depressed, the slide 4222 locks the slide 4188 against movement leftwardly until the arm 4220 is restored. If the lane 24 sensing pin 4180 does not encounter a control projection 1767, the slide 4189 is moved the maximum distance leftwardly to lock the slide 4200 and to permit the latch lever 4230 to enter into the deeper portion of the notch 4234 in the slide 4189 and into the notch 4232 in the slide 4188 and thus lock both slides until the drive bail 531 returns to normal after the lever 4202 has returned to normal.

If the lane 24 sensing pin 4180 encounters a #4 control projection in a machine cycle in which no key 255 is depressed, the slide 4222 will lock the slide 4188 against leftward movement as above described, but the slide 4189 will be moved leftward to its middle position where it does not lock the slide 4200 but permits the latch lever 4230 to enter into the shallower portion of the notch 4234 and far enough into notch 4232 in the slide 4188 to lock the latter beyond the time of restoration of the extension 4220 and slide 4222 and until the drive bail 531 returns to normal position.

ENTRY OF PREVIOUS COUNT TOTALS AND GROUP COUNTS

In some kinds of work, the amount total of a group of items may be entered as a single amount and a count corresponding to the number of items in the group should be entered instead of an automatic unit count. When setting the group amount total on the keys 255 of rows 1 to 10, the group count can be set on the keys 255 of rows 11 to 14 and will be entered in the counting sections of both the crossfooter and the active register while the group amount is being entered on the amount pinions of both the crossfooter and the active register.

For each of the rows 12, 13 and 14 of count keys 255, there is provided beside the usual guide plate 273 and key latch slide 275, a further slide 4240 (FIG. 7) extending lengthwise of the key row through the slots in the stems of all the keys 255 in the row and supported at both ends for forward and rearward sliding movement on the crossrods 274. Each slide 4240 is normally held at its rearward limit by a tension spring 4241 connected between the rear end of the slide and the rod 281. The upper edge of each slide 4240 is formed with downwardly and rearwardly inclined cam edges 4242 under the cross bars 272 of the stems of each of the keys in the row so that, upon depression of any count key of the rows 12, 13 and 14, the slide 4240 for that row will be cammed forwardly against the tension of its spring 4241 which will restore the slide 4240 when the depressed key is restored. The lower portion of the front end edge of each slide 4240 abuts against the rear edge of a bail 4243 having upward side arms secured to a shaft 4239 which extends the full width of the keyboard and is rotatably supported in the front ends of the keyboard spacing plates 259. At its left end, the bail 4243 has a downwardly extending arm 4244 having at its lower end a latch shoulder normally located rearwardly of a leftward lug on the forward end of an arm 4245 secured at its rear end on the left end of the shaft 4212.

When any count key 255 in any of the count key rows 12, 13 or 14 is depressed, it moves the associated slide 4240 forwardly to rock the bail 4243 to swing its latch arm 4244 forwardly and place the latch shoulder on the lower end of the latter under the lug on the arm 4245 to prevent the shaft 4212 and arm 4214 from rocking from normal position to place the stop shoulder 4215 in position to limit the rearward movement of the stop slide 483 of the lowest order counting key row 11 while the depressed key limits the rearward movement of the stop slide 483 for its own key row. There is no need for a slide 4240 for key row 11 because the "1" key of that row, if depressed, will arrest the stop slide 483 for that row at the same point at which it would be arrested by the stop shoulder 4215 of the lane 24 automatic count control means and any of the other keys of that row would arrest the stop slide at shorter distances from normal position. Thus, in any machine cycle other than a total or subtotal-taking cycle, any group count or previous count total set up on the count keys will be entered into the count section of the crossfooter if the crossfooter controls are not in non-add condition and into the count section of the selected register, if the function controls for the multiple register unit are not in non-add condition.

CONTROL OF ADDITION, SUBTRACTION AND SUPPRESSION OF COUNTS IN CROSSFOOTER

Both debit and credit items can be counted additively in the crossfooter and counts may be correctively reduced by subtractive count entries while incorrectly entered debit and credit item amounts are reentered with reversed sign to correct the amount balances. Such corrective reductions of counts are controlled by the keys 320, 326 and 4103 referred to hereinafter as the correction keys. Counting in the crossfooter may be suppressed by depression of the Non-Count key 4102.

*Counting items while adding amounts*

In amount adding operations of the crossfooter, the forward amount pinions 775 are meshed with their actuator racks 511 after the latter have completed their forward differential movements and before they begin their return movements and are unmeshed from those racks after the latter have completed their return movements to normal. Because the forward counting pinions 4141 are normally aligned with their actuator racks 511 and move into and out of engagement with those racks simultaneously as the forward amount pinions 775 move into and out of engagement with their racks, it is readily apparent that any count entered in the count pinions, whether it is an automatic count set up by the lane 24 control or is a group count or previous count total set up on the count keys, will normally be added if the crossfooter is operated to add the amount.

*Counting items while subtracting amounts*

In an amount subtracting operation of the crossfooter, the forward amount pinions 775 are meshed with their actuators 511 prior to the forward movements of the latter to differential positions and are unmeshed from the racks after the latter have completed those forward movements and before they begin their return movements. To add in the count pinions an automatic count or a count entered on the count keys in an amount subtracting operation of the crossfooter, the count pinions are automatically cross-shifted to align the rear count pinions 4140 instead of the forward count pinions 4141 with the count actuator racks 511.

The shaft 4167 (FIGS. 4 and 11A) has secured on its right-hand end an arm 4250 (FIG. 11A), the upper end of which is pivotally connected to the forward end of a link 4251 (FIGS. 11A and 14) normally yieldingly held in its forward position by a tension spring 4252. The rear end of the link 4251 is connected to the lower end of a downward arm 4253 on the rightward side of a yoke member 4254 which is pivotally mounted on the stud 377 and has on its left side one arm 4255 extending forwardly under the stem of the crossfooter subtract key 324 which, upon being depressed, rocks the member 4254 counter-clockwise. The member 4254 has another arm 4256 which extends downwardly behind a stud 4257 secured in the link 1989 of the lane 7 automatic non-add and subtract control. When the link 1989 is pulled rearwardly the short distance required to place the front crossfooter controls in non-add condition the stud 4257 does not rock the lever 4253—4256 but when the link 1989 is pulled farther rearwardly to condition the front crossfooter controls for subtraction, the stud 4257 rocks the lever 4253—4256 counter-clockwise. When so rocked either by the stud 4257 or by the key 324, the member 4253—4256 pulls the link 4251 rearwardly against the tension of the spring 4252 and rocks the arm 4250, the shaft 4167 and its arm 4166 (FIG. 4) to lower the stud 4165 to permit the front end of the link 4164 to drop to engage the stud 4162 in the vertical branch of the L-shaped slot 4163. Then, when the link 4164 is pulled rearwardly in the machine cycle as previously explained, the lever 4160 and arm 4150 are rocked rearwardly to cross-shift the crossfooter counting pinions to align the rearward pinions 4140 with the count actuators 511. Any of the latter moving to differential position will, therefore, rotate the counting pinions of the corresponding order in the adding direction while those actuator racks move forwardly.

*Corrective reduction of count while adding amount*

The key 326 (FIG. 11A), when depressed, rocks the lever 2166 to position its lug 2170 immediately behind the shoulder on the link 919 to prevent the rearward movement of the latter which is necessary to permit conditioning of the front crossfooter controls for either subtraction or non-addition. Thus, the key 326, when depressed, retains the front crossfooter controls in add condition in the same manner as disclosed in the Butler patent. The present lever 2166, however, has an added short upward extension 4259 under the stem of the key 4103 so that the latter, when depressed, also rocks the lever 2166 to retain the front crossfooter controls in add condition. The yoke portion of the lever 2166 now extends rightwardly and its right side is pivotally supported on the end portion of the stud 386 and provided with a downward arm 4260 carrying a stud 4261 extending rightwardly through a forwardly and rearwardly elongated slot in the link 4251 and normally located in the rear end of that slot. Thus, the lever 2166 is rocked by depression of either of the keys 326 and 4103 to pull the link 4251 rearwardly to cause the rear counting pinions 4140 to be aligned with their actuator racks 511 for subtractive rotation by any advanced ones of those racks in a machine cycle in which the forward amount pinions 775 are meshed with their actuator racks 511 and unmeshed therefrom in addition timing.

The correction keys 326 and 4103, thus, both serve to cause subtractive entry of counts in the crossfooter for corrective count reduction while previously subtracted amounts of incorrectly entered items are reentered additively in the crossfooter to correct the amount balance.

*Corrective reduction of count while subtracting amount*

The lever (2165) which, in the machine of the Butler patent, was operated by depression of the key 320 to hold the controls of the rear or B-position computing mechanism in adding condition, has been replaced by a lever 4262 (FIG. 11A) which is similarly pivotally supported on the stud 386 with a forward arm terminating under the stem of the key 320 and a downward arm carrying a stud 4263 engaged in a slot in an upward arm of the right side of a yoke member 4264 pivotally mounted on the stud 922. The cross portion of the yoke 4264 has an upward projection 4265, the end of which is bent rearwardly to engage the forward edge of the arm 920 of the front crossfooter non-add and subtract control bell crank 920, 921. The key 320, when depressed, rocks the lever 4262 and bell crank 920, 921 far enough to place the front crossfooter controls in subtracting condition to cause the crossfooter amount pinions 775 to mesh with and unmesh from their actuator racks in subtraction timing while leaving the forward counting pinions 4141 to mesh with and unmesh from the count actuator racks 511 with the same timing for rotation in the subtractive direction by any advancing count actuator racks.

The correction key 320 thus serves to cause subtractive entry of counts in the crossfooter for corrective count reduction while previously added amounts of incorrectly entered items are reentered subtractively in the crossfooter to correct the amount balance.

*Disabling lane 24 controlled counting*

An arm 4266 (FIG. 4) secured on the rightward end of the shaft 4239 terminates under the stem of the Non-Count key 4102 so that, upon depression of that key, the arm 4266, shaft 4239 and the bail 4243 secured on the leftward portion of said shaft are rocked clockwise to place the latch shoulder of the arm 4244 under the lug on the arm 4245 and thereby prevent the shaft 4212 and arm 4214 of the lane 24 controlled automatic count mechanism from rocking to effective position to enter an automatic count in the counting section of either the crossfooter or the active register.

The Non-Count key 4102 may be latched in depressed position continuously as long as desired by a small latch 4267 settable by a finger piece 4268.

AUTOMATIC CONTROL OF COUNTING IN MULTIPLE REGISTERS ALONE

The link 834 (FIGS. 9 and 10) connected with the tenth order yoke 827 of the transfer mechanism of the multiple register unit now has a downward and rearward extension carrying a stud 4270 projecting leftwardly between the ends of the two arms 4271 and 4272 of a lever secured on the left end of a shaft 4273 rotatably supported in the righthand side plate 2818 (FIG. 11A) and in the partition plate 821 next leftward of the transfer segment 850 for the eleventh-order pinions. The shaft 4273 and lever 4271, 4272 are normally yieldingly held in a position in which the ends of the arms 4271 and 4272 are substantially equally spaced from the normal position of the stud 4270 by a spring 4274 coiled about the shaft 4273 and having its straight ends embracing between them both the fixed rod 765 and a stud 4275 secured in and extending leftwardly from the arm 4271 and into an arcuate slot in the previously mentioned partition plate 821 which prevents overthrow of the shaft 4273 and arms 4271 and 4272 in both directions. A two-armed lever 4276 (FIG. 11A) secured on the rightward end of the shaft 4273 rightward of the right side frame plate 27 of the machine carries in its forward and rearward ends, respectively, two rightwardly projecting studs 4278 and 4277.

The new tenth-order link 834, like the link which it replaces, when moved downwardly from normal position conditions the parts controlling and actuating the transfer segment 850 for the eleventh-order pinions of the multiple register unit to enter "1" additively on the eleventh-order pinion 2803 of the active register, and movement of new link 834 upwardly from normal conditions the same parts to enter "1" subtractively on that pinion. However, because of the omission of the finger 830 from the tenth-order yoke 827, the associated link 834 is not operable by the tenth-order pinions 2803, but is moved downwardly from normal to cause an addition of "1" on the eleventh-order pinion 2803 of the active register, that is, in the lowest order of the counting section of that register, by rocking of the shaft 4273 clockwise from normal position by depression of the stud 4277, and is moved upwardly from normal to cause a subtraction of "1" on the eleventh-order pinion 2803 by rocking the shaft 4273 counterclockwise from normal by depression of the stud 4278.

A bracket 4285 (FIG. 11A) has at its leftward side a pair of upward arms by which it is mounted on the lower part of the right side plate 2818 of the multiple register unit. The horizontal portion of the bracket 4285 extends rightwardly under the right side plate 27 of the machine frame. Another pair of arms of the bracket 4285 extend upwardly at the right of the plate 27 and carry screw studs 4286 which support a slide 4287 for forward and rearward movement. The slide 4287 is normally yieldingly held at its forward limit on the studs 4286 by a tension spring 4288 connected between the slide and an arm of the bracket 4285. The slide 4287 has aligned upwardly and downwardly extending arms carrying studs 4289 on which an upwardly and downwardly movable slide 4290 is mounted. The slide 4290 is normally yieldingly held at its upward limit on the studs 4289 by a tension spring 4291 connected between a lug on the lower end of the slide 4290 and a lug on the end of the upward arm of the slide 4287. The slide 4290 has two arms 4292 and 4293 extending rearwardly and forwardly, respectively, from the midportion thereof and both having downwardly extending end portions so located that the end of the rear arm 4292 is above the stud 4277 while the slide 4287 is in its normal forward position, whereas the front arm 4293 is above the stud 4278 while the slide 4287 is positioned rearwardly by means described hereinafter.

The top edge of the upper end of the slide 4290 is of such length that, regardless of the forward or rearward movement of the slide 4290 with the slide 4287, it is always under a stud 4295 in the forward end of the right side arm of a yoke 4296 rockably supported on a stud 4297 secured in the register side plate 2818 and extending through the machine frame plate 27. The forward end of the left side arm of the yoke 4296 is pivotally connected with the lower end of a link 4298. The upper end of the latter pivotally embraces a stud 4299 extending through a slot in the plate 27 and secured in the forward end of the right side arm of a yoke 4300 (FIGS. 11A and 11B), the two side arms of which are rockably supported on studs secured in upward arms of a bracket 4301 secured to the top of the cross member 36. A tension spring 4302 (FIG. 11B) connected between a lug on the upper end of the left arm of the bracket 4301 and a stud in a short forward projection of the left side arm of the yoke 4300 normally yieldingly holds said projection engaged against the underside of a limit stud 4303 secured in the left side arm of the bracket.

A downward arm extension 4304 of the left side of the yoke 4300 carries a stud pivotally supporting a pass-by pawl 4305. A light tension spring 4306, connected between a forward projection on the arm 4304 and a lug on the pawl 4305, yieldingly urges the pawl counterclockwise against a limit lug 4307 on the arm 4304. A downwardly projecting finger of the pawl 4305 is normally in the path of forward movement of a stud 4310 secured in the right side of a slide 4311 mounted for forward and rearward sliding movement on the rods 514 and guided in slots in the cross members 36, 37 and 38 similarly to the actuator racks 511. The slide 4311 is yieldingly urged forwardly by a spring 4312 connected at its rear end to a stud in the slide and at its forward end to the cross member 37. The slide 4311 has a shoulder 4313 which is engaged by the differential actuator drive bail 531 which thus holds the slide 4311 in its normal rearward position while the bail is in its normal rearward position.

A latch pawl 4315 pivoted at its forward end on the rear rod 514 has a lower leftward projection 4316 which normally is held engaged in a notch in the lower edge of the slide 4311 by a tension spring 4317 connected between the projection 4316 and a stud secured in the bracket 4191. The latch pawl 4315 also thus normally holds the slide 4311 against movement forwardly from its normal rearward position. The latch pawl 4315 also has an upper leftward projection 4318 which has a rearwardly and downwardly inclined rear edge and is normally spaced above and in vertical alignment with a notch formed in the upper edge of the slide 4311 and having an undercut rear end complementary to the inclined rear edge of the latch projections 4318. An upward extension 4319 of the rear end of the pawl 4315 is engaged under a lower rightward arm of the lane 17 control lever 4320 pivotally mounted on the stud 4182. A tension spring 4321 connected between a stud secured in the bracket 4183 and a downward arm of the control lever 4320 normally holds a roller stud 4322 carried by an upper rightward arm of the control lever engaged against the edge of the lane 17 control cam disc 4323 secured on the shaft 1874. A leftward fourth arm of the control lever 4320 is connected with the lower end of a sensing pin 4325 guided in the lane 17 opening in the guide plate 1805.

The lower edge of the slide 4188 is normally engaged in a notch in the rear upper edge of the slide 4311 to lock the latter against forward movement except in machine cycles in which at least one key 255 is in depressed position. In such a machine cycle initiated with the paper carriage in a position in which there is no control projection 1767 above the lane 17 sensing pin 4325, the control lever 4320 is rocked clockwise the maximum distance by the spring 4321 as the drop-off of the cam disc 4323 passes under the roller 4322 during about the 15° to 55° portion of the cycle so that the lower rightward arm of the control lever 4320 depresses the latch pawl 4315 fully to seat its upper projection 4318 in the notch in the upper edge of the slide 4311 to lock the latter against forward movement throughout the time in the machine cycle in which the bail 531 is forward of its normal position. During about the 115° to 162° portion of the machine cycle, a rise on the cam disc 4323 restores the control lever 4320 and sensing pin 4325 to normal, but the latch pawl 4315 is unable to rise to normal position again until the actuator drive bail 531, completing its return to its normal rearmost or "0" position at about the 260° point in the machine cycle, presses the slide 4311 slightly rearward of its latched position to release the rear edge of the latch projection 4318 from the undercut rear edge of the notch in the upper edge of the slide 4311.

In a machine cycle in which at least one key 255 is depressed and which is initiated with the paper carriage in a positon in which a #7 control projection 1767 limits the rise of the sensing pin 4325, the slide 4188 moves leftwardly as previously explained and aligns a notch in its lower edge with the upper edge of the slide 4311, and the control lever 4320 is rocked by the spring 4321 far enough as the drop-off of the cam disc 4323 passes under the roller 4322 to depress the latch pawl 4315 to an intermediate position where both projections 4316 and 4318 are disengaged from the slide 4311. The latter is then free to move forwardly as the bail 531 advances and carry its stud 4310 forwardly past the pass-by pawl 4305, the latter being first rocked idly by the stud 4310 and then snapped back to normal position on the arm 4304 as the stud passes the pawl. In the subsequent return of the slide 4311 rearwardly to normal position by the bail 531 as the latter returns to normal, the stud 4310 acts on the pass-by 4305 to rock the arm 4304 and the yoke 4300 counterclockwise, thereby depressing the link 4298 (FIG. 11A) and rocking the yoke 4296 clockwise to lower the stud 4295 and move the slide 4290 downward against the tension of its spring 4291 and depress either the stud 4277 or the stud 4278 to cause "1" to be either added or subtracted on the lowest order counting pinion 2803 of the active register, depending on the forward or rearward position of the slides 4290 and 4287.

In most accounting work the amounts of items are normally added in the registers and counts of the items should also be accumulated additively in the count sections of the registers. The register function controls are normally in adding condition so that item amounts normally will be added in the amount sections of the registers and any group counts or previously accumulated total counts entered on the count keys 4255 normally will be added on the count pinions of the active registers. Also, as previously mentioned, the slides 4287 and 4290 are normally maintained in their forward positions by the spring 4288 so that automatic unit counts entered by the lane 17 controlled automatic register count mechanism just described normally will also be accumulated additively in the count section of the active register and even though the register function controls may be conditioned for subtractive entry of amounts by depression of the subtract bar 318 or by the lane 11 automatic control.

CORRECTIVE REDUCTION OF COUNTS IN MULTIPLE REGISTERS

Corrective entries are usually made with the paper carriage in the same columnar position it occupied when the incorrect entry was made. Item amounts are usually added in the registers so that a corrective amount entry is usually subtracted from the register. In such cases, corrective count entries entered in the register through the count actuator racks 511 either under control of the count keys 255 of rows 11 to 14 or under control of the lane 24 automatic count control will be in the correct algebraic sense as they will be added in the count section of the active register in the amount section of which the item amount is added and will be subtracted from the count section of that register when the item amount is subtracted from the amount section.

The lever 2166 (FIG. 11A), operated by depression of either of the correction keys 326 and 4103, has a rearward arm 4330 and the lever 4262 operated by depression of the correction key 320 has a rearward arm 4331. Both of the arms 4330 and 4331 extend under a stud 4332 secured in the forward end of a lever 4333 (FIG. 14) pivoted intermediate its ends on the stud 254. The rear arm of the lever 4333 has a portion 4334 bent flatwise to overlie the end of the stud 738 of the bi-color ribbon control lever 737 as well as a stud 4335 secured in an added forward arm 4336 of the B register non-add and subtract control lever 931, 932. Thus, depression of any of the three correction keys 320, 326 and 4103 will rock one of the levers 2166 or 4262 and its rearward arm 4330 or 4331 to rock the lever 4333 clockwise and the lever 931, 932 counterclockwise far enough to place the B register function controls in subtraction condition and at the same time rock the ribbon control lever 737 to red printing position. Thus, in a machine cycle performed with any one of the correction keys 320, 326 or 4103 depressed, an amount set on the amount keys of rows 1–10 will be subtracted from the amount section of the active B register and printed red and any count entered on the count keys 255 of rows 11–14, or an automatic count, if no count keys are depressed but a #4 control projection 1767 limits the rise of the lane 24 sensing pin 4180, will be subtracted from the count section of the same register.

The lane 17 controlled automatic register count mechanism as previously described normally causes a count unit to be added in the count section of the active register in a machine cycle in which the lane 17 sensing pin 4325 encounters a #7 control projection 1767. If, however, any one of the correction keys 320, 326 or 4103 is in depressed position in a machine cycle in which the lane 17 controlled automatic count mechanism is effective, the count unit will be entered subtractively in the count section of the active register. The lever 4262 (FIG. 11A) has an arm 4337 which extends downwardly in front of a stud 4338 secured in a forward extension of the slide 4287 and the arm 4260 of the lever 2166 also extends downwardly in front of the stud 4338 so that upon depression of any one of the correction keys 320, 326 or 4103, the arm 4260 or the arm 4337 will shift the slides 4287 and 4290 rearwardly to position the arm 4292 of the slide 4290 rearwardly clear of the stud 4277 and position the arm 4293 of the slide 4290 over the stud 4278. Thus, if the lane 17 sensing pin 4180 encounters a #7 control projection 1767 in a machine cycle while any one of the correction keys 320, 326 or 4103 is in depressed position, the shaft 4273 will be rocked counterclockwise as the link 4298 is depressed to cause a count to be subtracted from the count section of the active B register.

DESIGNATION CHARACTER SELECTION

The stop lugs 486 (FIG. 11A) on the differential stop slide 485 for the row of designation keys 256 are arranged to enable depressed ones of the nine keys 256 of the row 0 to arrest the slide 485 in respective ones of rearward nine of its twelve positions and so position the stop sector 492 connected therewith to arrest the differential actuator slide 512 in respective ones of the rearward nine of its twelve positions. The designation character (0-order) type bar 562 located in the second position from the right (second from the left in FIG. 2) between the B register function symbol type bar 562 in the first position at the right and the function symbol type bar which is third from the right, is thereby elevated to position respective ones of the top nine of its twelve designation character types 561 at the printing line. The three correction keys 320, 326 and 4103 control means which, while any one of these keys is depressed, limits the movement of the stop sector 492 to respective ones of positions permitting movement of the actuator slide 512 to respective ones of its farthest forward three positions to enable it to raise the designation character type bar to position respective ones of its lowest three types at the printing line to print a designation corresponding to the depressed one of the correction keys, such as DC (for Deposit Correction) for the key 320, EC (for Error Correction) for the key 326, or RT (for Returned) for the key 4103.

A lever (FIG. 11A) pivoted on the stud 386 leftward of the lever 2166, and urged clockwise by a spring 4342, has a forward arm 4343 terminating under the stem of the RT correction key 4103, a rearward arm having a rightwardly bent end 4344 having on its lower edge two steps each above a respective one of the rearward arms 4330 and 4331 of the levers 2166 and 4262 rocked by depression of the EC and DC correction keys 326 and 320, and another rearward arm having an upturned end 4345 with a stepped forward edge rearward of a stud 4346 extending through a slot in the machine side plate 27 and secured in the right side arm of a yoke 4347 pivoted on the shaft 496. The left side arm of the yoke 4347 has in its end portion a radially elongated slot embracing the rightward end of the somewhat elongated stud 489 which extends through the arm 490 of the stop sector 492 and is secured in the differential stop slide 485 for the row of designation keys 256. The upper end of the stepped portion 4345 is normally just below the path of the stud 4346 but when the lever 4262 is rocked by depression of the DC correction key 320, the arm 4331 engages the higher step on the arm 4344 and rocks the lever 4343—4345 far enough to place the uppermost and rearmost step of the arm 4345 in the path of the stud so that the third lowermost designation type "DC" will rise to the printing line as the type bars are raised. When the lever 2166 is rocked by depression of the EC correction key 326, its rearward arm 4331 engages the lower step on the arm 4344 and rocks the lever 4343—4345 to place the middle step of the arm 4345 behind the stud 4346 to select the second lowest designation type "EC" for printing. When the RT key 4103 is depressed, it directly engages the arm 4343 and rocks the lever 4343—4345 farthest to position the lowest and foremost step of the arm 4345 behind the stud 4346 to select the lowest designation type "RT."

The designation "LS" (for List) may be printed from either of two types, one being on the 0-order designation character type bar 562 and the other being substituted for the negative subtotal symbol type on the 18-order A crossfooter function symbol printing type bar so as to be positioned at the printing line in each subtotal-taking operation of the crossfooter. The former is selected by depression of an LS key 256 in rearmost position of the 0 row of keys.

OTHER COUNTERS

A slide 4339 (FIGS. 11B, 12 and 13) is mounted similarly to the slide 4311 and similarly urged by a spring 4340 to follow the bail 531 forwardly and returned to normal by the bail. The slide 4339 is also controlled by the control slides 3352, 4188 and 4189 to permit forward movement by the spring 4340 in selected cycles of operation of the machine to operate a dial counter 4341 (FIG. 1) for any desired counting purpose such as, for example, to count operations performed with the paper carriage in a columnar position in which the #1 register is active and a #4 control projection 1767 is above the lane 24 sensing pin 4180 while at least one key 255 is depressed. Additional similar slides may be provided to operate additional counters when desired.

LISTING, COUNTING AND TOTALING AMOUNTS AND COUNTS OF GROUPS OF ITEMS

Frequently, items to be posted may be received by the machine operator in groups. Such a group of items may or may not be accompanied by a list previously prepared on an adding machine tape and showing the count and amount totals of the group of items. When such a pre-list is present, the operator of the present machine may enter the count total of the group on the count keys and the amount total on the amount keys before operating the machine with the paper carriage in the appropriate item columnar position. When no pre-list is provided, the operator may of course enter the items singly with the carriage in such appropriate item columnar position so that the automatically controlled crossfooter and/or register counting mechanisms will accumulate the desired correct count in the manner previously described, but it is frequently desirable that suitable lists of the grouped items be prepared on tally strips separate from the ledger and journal or other work forms. The carriage of the present machine, as previously mentioned, has a split platen, the left section of which is separately line-spaceable and of appropriate width for a continuous tally strip, indicated at 4348 in FIGS. 1 and 24, upon which group item lists may be prepared. To avoid tying up one of the B registers for that purpose, the group amount and count totals are produced in the A crossfooter which must, therefore, be in a clear condition at the start of the listing operation. After completing the previous posting and before entering the old balance pick-up for the account to which the unlisted group of items is to be posted, the operator will depress the carriage right shift key 1518 to shift the carriage to the tally strip listing columnar position before starting the list operation. It is necessary that the paper carriage should not tabulate out of the listing columnar position until the list is completed. To minimize the amount of effort required from the operator for such work, the present machine has provisions to effect line-spacing of the platen and non-tabulation of the carriage in operations initiated by depression of the Main motor bar 291 so that the operator is not required to reach farther for the small Vertical motor bar 293, and to secure skip-tabulation of the paper carriage past the old balance pick-up position to the appropriate item position in a machine cycle initiated by depression of the crossfooter subtotal key 322 to complete the list by printing the group count and amount totals thereon. The operator's work is further speeded up and made easier because the count and amount totals are printed in the appropriate item column by a repeat crossfooter subtotal operation after which the carriage automatically returns to the old balance pick-up position. To obtain such advantageous results it has been necessary to solve several problems and provide additional controls as described hereinafter.

In connection with the following description of the new controls of carriage tabulating and return movement and line-spacing, it should be noted that the controls associated with the small motor bars 292, 293 and 294 are the same as those of the preferred form of machine shown in FIGS. 1 to 175 of the Butler patent, although certain elements found in the modification shown in FIG. 176 of the Butler patent are included in the present machine as specifically pointed out hereinafter. As shown in FIG. 15, the links 1540, 1530 and 1573, which are pulled forwardly by depression of the small motor bars 292, 293 and 294, respectively, are connected to the upper ends of the levers 1543, 1722 and 1576, respectively, as shown in FIG. 152 of the Butler patent so that in machine cycles initiated by depressions of those motor bars, the uppermost bar 292 causes skip-tabulation of the carriage to columnar positions determined by the lane 1 control, the upper bar 293 (Vertical) disables both tabulation and return movement of the carriage but causes line-spacing, and the lowermost bar 294 normally—that is, when neither the lane 15 control nor the lane 20 control hereinafter described is effective—causes return movement of the carriage but, when the lane 15 control or the lane 20 control is effective, causes either a lane 1 controlled skip-tabulation of the carriage or, if the lane 3 control is also effective, a lane 3 controlled skip-tabulation.

As shown in FIGS. 15 and 17, the present machine includes the modified form of lane 15 control shown in FIG. 176 of the Butler patent rather than the form of lane 15 control shown in FIG. 152 of that patent. In machine cycles in which the lane 15 control is not blocked a #5 control projections 1767 encountered by the lane 15 sensing pin causes the lane 15 bell crank 2238 to be rocked to lower the roller 2035 far enough to restore the carriage return control yoke 1584 and the line-spacing control yoke 1727 (FIG. 18) to normal and thus prevent carriage return and line-spacing, and a #7 projection 1767 in lane 15 causes the bell crank 2238 to be rocked to a lesser extent to lower the roller 2035 only far enough to return the yoke 1727 to normal and thus prevent line spacing. The lane 15 bell crank 2238 (FIG. 15) is operated by the lane 15 sensing control lever 1843 through a yieldingly connected arm 2236 and has a lug 2241 normally blocked by an upward projection 2242 on a link 2243 slidably supported at its rearward end on a stud secured in the downard arm of the lane 4 bell crank 1854 (FIG. 17) instead of being pivotally connected with the latter to operate the latter as shown in FIG. 176 of the Butler patent. The forward end of the link 2243 is pivotally connected to the lower arm of a lever 2244 which is pivoted intermediate its ends on the stud 1544, urged clockwise by a spring 2245, and carries in its upper end a stud 2246 embraced in a slot in a short link 2247 pivotally supported at its rear end on the stud 2133 secured in the rearward end of the link 2134 and engaged in the rearward end of the link 1540 which is pulled forwardly by depression of the uppermost small motor bar 292. The stud 1730 in the upper arm of the lever 1576 which is rocked counterclockwise by depression of the lowermost motor bar 294 also extends rightwardly behind the upper arm of the lever 2244. Thus, the lane 15 control in the present machine is blocked in all machine cycles except those initiated by depression of either the uppermost motor bar 292 or the lowermost motor bar 294 to shift the link 2243 rearwardly to displace its projection 2242 from under the projection 2241 on the lane 15 bell crank 2238.

*Control of carriage movements by crossfooter subtotal key*

As above mentioned, when the machine is operated with the carriage in the item columnar position to again take from the A crossfooter the subtotal of the amounts of the items entered in the listing column, the paper carriage will move in the return direction to the old balance pick-up columnar position. For that purpose, the stud which previously pivotally connected the rear end of the link 387 (FIG. 16), which is pulled forwardly by depression of the lowermost motor bar 294, to the upper arm of the lever 388, to which the forward end of the link 1573 is also pivotally connected, has been replaced by a lengthened stud 4350 which extends rightwardly in front of the upper arm 4351 of a lever pivotally mounted on the shaft 218 and having a forward arm 4352 extending under the stem of the A crossfooter subtotal key 322 (FIGS. 14 and 16). Thus, depression of the subtotal key 322 pulls the stud 4350, the upper arm of the lever 388, and the link 1573 forwardly. The latter, just as when it is pulled forwardly by depression of the lowermost motor bar 294 rocks the lever 1576 (FIG. 15) counterclockwise so that the latter, through the stud 1730 secured therein, rocks also the levers 1722 and 1543 to effectively condition the line-spacing mechanism and prepare the lane 1 skip-tabulation control and, through the tension spring 1579, pushes rearwardly the link 1578 which partially conditions the lane 2 and lane 3 controls and acts on the stud 1580 to rock the carriage return control yoke 1581 counterclockwise to condition the carriage movement controls to cause a lane 2 controlled return movement of the carriage unless the yoke 1581 is returned to normal by the roller 2035 of the lane 15 control, in which case a lane 3 or a lane 1 controlled skip-tabulation of the carriage will result accordingly as a control projection 1784 is or is not also encountered by the lane 3 sensing pin.

*Lane 19 automatic control line-spacing of platen non-tabulation of carriage*

While entering successive items of a group with the carriage in the listing position, the normal tabulation of the carriage is suppressed. For that purpose, the previously unused automatic control lane 19 is utilized.

A sensing pin 4355 (FIG. 18) in the lane 19 position in the sensing pin row is connected with the rightward end of a sensing control lever 4356 which carries a roller 4357 bearing on the lane 19 control operating cam 4358 secured on the sensing control actuating shaft 1874 and of the same configuration as the lane 7 cam (1899). The leftward end of the control lever 4356 engages under the rearward arm of a bell crank 4359 pivotally mounted on the stud 1870 and urged clockwise by a tension spring 4360 connected between the stud 1929 and the downward arm of said bell crank which has a latching projection 4361 adapted to engage behind the lip of the latch bail 1928 when the bell crank is rocked counterclockwise by the control lever 4356. The downward arm of the bell crank 4359 is also pivotally connected with the rear end of a link 4362 (FIGS. 15 and 18) which is pivotally connected at its forward end to the lower arm of a lever 4363 pivotally mounted on the stud 1922. A pawl 4364 pivotally mounted on the upper arm of the lever 4363 is urged clockwise into engagement with a limit stud 4365 in the lever 4363 by a tension spring 4366 connected between a forward arm of the pawl and the upper end of the lever 4363. The pawl 4364 has a lower rearward hook portion 4367 normally extending downwardly behind the stud 1534. The pawl 4364 also has a finger 4368 extending upwardly in front of and rearwardly over a stud 4369 in the rearward arm of a lever 4370 pivotally mounted on the stud 1544 and having a forward arm 4371 extending leftwardly immediately in front of the upwardly projecting spring-connecting ears on the links 1573 and 1540. The corresponding ear on the link 1530 has its forward edge cut back so as not to engage the arm 4371. When either the link 1540 is pulled forwardly by depression of the uppermost motor bar 292 or the link 1573 is pulled forwardly by depression of either the lowermost motor bar 294 or the A crossfooter subtotal key 322, the lever 4370 is rocked counterclockwise so that its stud 4369 rocks the pawl 4364 also counterclockwise to swing its hook 4367 clear of the stud 1534.

In a machine cycle in which neither the subtotal key 322 nor either of the motor bars 292 or 294 is depressed but in which a #5 control projection 1767 is encountered by the lane 19 sensing pin 4355, the rightward end of the lane 19 control lever 4356 is elevated to rock the bell crank 4359 to latch its projection 4361 behind the latch bail 1928 and pull the link 4362 rearward to rock the lever 4363 counterclockwise so that the hook 4367 pulls the stud 1534 forwardly approximately as far as the latter would be pulled by the link 1530 upon depression of the motor bar 293. The yoke 1536 carrying the stud 1534 is thereby rocked clockwise so that its forwardly extending left side arm 1539 engaging the stud 1493 in the carriage tabulation control slide 1489 elevates the latter to inactive position and thereby suppresses the normal tabulation of the paper carriage in that machine cycle. Such forward movement of the stud 1534, which projects through a slot in the rear end of the link 1530, also moves the latter forwardly to rock the lever 1722 counterclockwise. The link 1724, which is connected to the lower end of the lever 1722 through the spring 1725 and to the line-spacing control yoke 1727 through the spring 1726, is thereby pushed rearwardly and rocks the yoke 1727 to lower the line-spacing control slide 1719 to active position to cause the line-spacing mechanism to operate in the machine cycle. If the carriage is in the listing position with the tally strip section of the platen opposed to the printing type bars, that section of the platen will be line-spaced rather than the right-hand section of the platen which is rotated by operation of the line-spacing mechanism when it is opposed to the type bars.

Thus, a #5 control projection 1767 in the listing columnar position in line 19 will prevent the paper carriage from tabulating out of the listing position and will cause line-spacing of the listing tape in each of a series of machine cycles initiated by the main motor bar 291 for listing the successive items of a group. In those machine operations the amounts of the items will normally be accumulated in the amount section of the A crossfooter and, if a #4 control projection 1767 is present in the listing columnar position in lane 24, an automatic count of the items will be accumulated simultaneously in the count section of the crossfooter. Then, when the list is completed by printing the sums of the counts and the amounts of the listed items in a machine cycle initiated by depression of the A crossfooter subtotal key 322, the hook 4367 of the pawl 4364 will be clear of the stud 1534 and the lane 19 control will be ineffective to prevent tabulation of the paper carriage. If a #5 control projection 1767 is also present in the listing columnar position in lane 15 and a control projection 1784 is present in the same columnar position in lane 3 as previously suggested, the return movement of the carriage which would otherwise follow the forward movement of the link 1573 by depression of the subtotal key 322 will be replaced by a lane 3 controlled skip-tabulation which can be terminated in the appropriate item columnar position by a long projection 1784 located in lane 3 a little ahead of the latter columnar position.

*Register non-added by crossfooter subtotal key*

As the paper carriage reaches the item columnar position after completion of the listing of a group of items, the crossfooter will contain the sum of the amounts and the item count of the group so that both the group count and the amount total of the group can be printed in the item column by a subtotal taking operation of the crossfooter which the operator may initiate by merely continuing to hold the crossfooter subtotal key depressed until the carriage moves to the item columnar position. The group amount and count totals would, in the absence of other provisions, be added in that one of the B registers selected by the lane 25 register selecting control for operation in the item columnar position of the paper carriage. It is generally preferred that the same register should be selected for operation in the listing columnar position of the paper carriage and, instead of being there non-added by the lane 11 automatic control, it should add the amounts and counts of the items as they are listed. In that event, the B register controls should be placed in non-add condition during the crossfooter subtotaling operation in the item columnar position so that the amounts and counts of the group of items should not be added a second time in the register. For that purpose the forward end of the lever 4352 depressed by the crossfooter subtotal key 322 is preferably extended rightwardly over an upper forward left side arm 4373 of the yoke of the B register subtract and non-add control lever bell crank 932 so as to rock the latter to position to non-add the B register when the A crossfooter subtotal key 322 is depressed.

*Lane 20 control skip-tabulation*

It is desirable to employ the lowermost motor bar 294 as a "Balance Bar" to initiate the machine cycle for entering the last debit or credit item in a posting, to cause a tabulation or skip tabulation of the carriage to the new balance columnar position and then to initiate automatically a machine cycle in which an automatic total-taking operation of the crossfooter will be performed under control of the lane 6 control mechanism. When the lane 15 control is employed as previously indicated to obtain a skip-tabulating movement of the carriage instead of a return movement in consequence of the rearward movement of the link 1573 by the crossfooter subtotal key 322 when the latter is depressed with the carriage in the listing columnar position, the same control cannot be employed to produce a skip-tabulating movement of the paper carriage when the same link 1573 is pulled rearwardly by depression of the lower motor bar 294 to initiate a machine cycle with the carriage in the item columnar position from which, in a machine cycle initiated by depression of the crossfooter subtotal key 322, the carriage should return to the old balance pick-up position. A further automatic control is needed, for which lane 20 is now employed.

A sensing pin 4375 (FIG. 19) guided in the lane 20 aperture in the guide plate 1805 is connected at its lower end to the leftward end of the lane 20 control lever 4376 which carries a roller 4377 bearing on the edge of the lane 20 cam disc 4378 secured on the shaft 1874. The rightward end of the control lever 4376 is located under the rearward end of an arm 4379 forwardly and rearwardly slidably mounted on studs secured in a bell crank 4380 and normally urged to its rearward limit on those studs by a tension spring 4381. The bell crank 4380 is pivotally supported on the shaft 1870 and urged clockwise by a tension spring 4382 which normally maintains the arm 4379 engaged downwardly against the limit stud 1871. The forward arm of the bell crank 4380 carries a roller 4383 normally located above a downwardly and rearwardly extending cam arm 4384 on a rightwardly extending yoke portion 4385 which has been added to the carriage return control yoke 1581. A stud 4386 secured in the forward portion of the slidable arm 4379 is normally located immediately in front of a downward finger on the rear end of a link 4387 slidably guided on the stud 1547 and normally held at its rearward limit against the limit stud 221 by a tension spring 4388. The forward end of the link 4387 is pivotally connected to the upward arm of the lever 4351 so that when the latter is rocked counterclockwise by depression of the A crossfooter subtotal key 322, the link 4387 and the arm 4379 are pulled forwardly to disengage the latter from the control lever 4376 and thereby render the lane 20 control ineffective.

When, in a machine cycle in which the link 1573 is pulled forwardly by depression of the lowermost motor bar 294, and not by depression of the crossfooter subtotal key 322, the lane 20 sensing pin 4375 encounters a #5 control projection 1767, the rightward end of the control lever 4376 will be elevated and will rock the bell crank 4380 far enough to engage its front latch tooth 4389 behind the lip of the latch bail 1928 and to lower the roller 4383 far enough to act on the cam 4384 to restore the carriage return control yoke 1581 to normal ineffective position so that a skip-tabulating movement of the carriage will be obtained.

As in the machine of the Butler patent, the latch bail 1928 is moved to releasing position at a point so late in the machine cycle that the return of the bell crank 4380 or the lane 19 bell crank 4359 to normal position will not permit operation of the carriage return mechanism or the tabulating mechanism in that cycle.

If, however, the link 1573 is pulled forwardly by depression of the crossfooter subtotal key 322, the link 4387 and arm 4379 will also be pulled forwardly to disengage the latter from the lane 20 control lever 4376 so that the carriage return control yoke 1581 will remain in effective position to cause a lane 2 controlled return movement of the paper carriage.

If in the same machine cycle a #7 control projection 1767 is encountered by the lane 15 sensing pin, the bell crank 2038 will, as disclosed in the Butler patent, be rocked to lower the roller 2035 only far enough to act on the cam arm (2039) of the line space control yoke 1727 to restore the latter to normal ineffective position without acting on the cam 2040 to suppress return movement of the paper carriage.

CROSSFOOTER NEGATIVE TOTAL LOCK

In some kinds of work, such as posting checking accounts in bank bookkeeping, it is desirable to prevent the new balance total-taking operation and thereby notify the machine operator when an overdraft or negative balance is present in the amount section of the A crossfooter. However, the negative total lock should not be effective to prevent the subtotal-taking operation of the crossfooter in completing a listing of a group of items with the carriage in the listing columnar position or to prevent the repeat subtotal operation in the item columnar position where the items are subtractively entered in the crossfooter which will, therefore, contain a negative sum.

The lane 3 control, used in combination with either the lane 15 control or the above-described lane 20 control, may be set to produce movement of the paper carriage directly to the new balance columnar position in any machine cycle initiated by depression of the lowermost motor bar 294. There, by means of the lane 6 control, the A crossfooter controls may be conditioned automatically for total-taking. By means of the lane 18 control, as disclosed in the Butler patent, the release of the small motor bar latch means may be prevented so that the bar 294 will remain latched down to initiate automatically a machine cycle with the carriage in the balance columnar position. In the present machine, an interlock is operated by means conditioned by the lowermost motor bar 294 when it is depressed and held down beyond the end of the machine cycle for control by the crossfooter in accordance with the sign of the balance therein to prevent the initiation of a further machine cycle by the holding down of that motor bar when the balance is negative.

A further latch bell crank 4395 is now rockably supported on the shaft 2907 leftwardly of the latch arm 2906 secured thereto. The latch arm 2906, as disclosed in the Runde application, prevents initiation of a machine cycle until the multiple register pinion assembly has returned to its #1 register position from any other register selecting position it occupied in a preceding machine cycle. A forward arm of the latch crank 4395 has a latch shoulder 4396 normally located just forwardly of and below the latch lug 2905 on the machine cycling control lever 145. The lower arm of the bell crank 4395 carries a stud 4397 embraced in an elongated slot in the rearward end of a link 4398 and is also connected with said link through a tension spring 4399 which normally holds the stud 4397 in the forward end of the slot in the link 4398. The forward end of the link 4398 is pivotally connected to the lower end of an arm 4400 secured on the left end of a shaft 4401 which is journaled in the brace members 49 and in the right hand frame plate 27. A bell crank 4402, secured to the rightward portion of the shaft 4401 on the left side of the plate 27, has a rearward arm extending under a stud 4403 carried by an arm 4404 secured to and extending rearwardly from the shaft 500 which, in each machine cycle, rocks to swing the bail 498 first rearwardly and later forwardly to normal position to effect the excursions of the stop slides 483. The bell crank 4402 is urged counterclockwise by a tension spring 4405 and its upper arm is pivotally connected to the rearward end of a link 4406. A stud 4407 secured in the frame plate 27 extends leftwardly through an aperture in the forward portion of the link, the aperture being of such size and form as to permit necessary upward and downward as well as rearward and forward motion of the forward portion of said link 4406 which extends under the stem of the lowermost motor bar 294. A tension spring 4408 yieldingly holds the link 4406 upwardly. The upward arm of a two-armed lever 4409 pivotally supported on a stud 4410 secured in the plate 27 terminates just rearwardly of a stud 4411 secured in and projecting rightwardly from the link 4406. A latch pawl 4412 pivoted on a stud in the leftward side of the link 4406 and urged counterclockwise by a tension spring 4413 has on its forward arm a lug 4414 extending rightwardly through an aperture in the link 4406 and located just rearwardly of and normally higher than the end of the upper arm of the lever 4409. The lower arm of the lever 4409 is formed with a rearwardly open notch which normally embraces the stud 904 which is controlled, in the manner disclosed in the Butler patent, by portions of the "fugitive 1" mechanism in accordance with the algebraic sign of the total contained in the amount section of the crossfooter. While that total is positive, the stud 904 is in its upper position in alignment with the notch in the lower arm of the lever 4409, but when the accumulated balance in the crossfooter becomes negative the stud 904 is moved downwardly to a position in alignment with a rearward projection 4415 of the lower arm of the lever 4409 below the notch.

A detent lever 4416 pivotally mounted on a stud in the plate 27 is urged clockwise by a tension spring 4417 and has an upper arm normally engaged by the forward end of the control slide 2887 which is moved rearwardly at the beginning of each machine cycle, and is again returned forwardly at the very end of the machine cycle to trip the latch means holding the multiple register pinion assembly in selected register position, as disclosed in the Runde application. At the beginning of each machine cycle, the spring 4417 is therefore permitted to move the detent lever 4416 clockwise to move its lower forward latch arm toward a latch shoulder 4418 on the lower arm of the lever 4409. Except in machine cycles in which the lowermost motor bar 294 is in depressed position, the shoulder 4418 on the lever 4409 is in the path of the latch shoulder on the detent lever 4416.

As the shaft 500 and arm 4404 are rocked clockwise in each machine cycle, the stud 4403 rocks the bell crank 4402 clockwise to pull the link 4406 rearwardly so that the stud 4411 rocks the lever 4409 clockwise to move its detent shoulder 4418 forwardly of the shoulder on the detent lever 4416. Thereupon, inasmuch as the control slide 2887 has already been moved rearwardly, the spring 4417 rocks the detent lever clockwise to place its detent shoulder behind the shoulder 4418 of the lever 4409. Such rocking of the lever 4409 also moves its rearwardly projecting lower end 4415 forwardly of the stud 904. The lever 4409 is held in this latched position until the end of the machine cycle, when the slide 2887 again restores the detent lever 4416 to normal and thereby releases the lever 4409. While the lever 4409 is in its latched position during the machine cycle, the stud 904 is free to move downwardly as it will if and when the net accumulation in the crossfooter becomes negative. If the stud 904 remains in positive total position, the parts are free to restore to their normal positions at the end of the machine cycle. If, however, the stud 904 is moved downwardly to negative total position in consequence of the occurrence of an overdraft in the crossfooter, the lever 4409 is prevented from restoring to normal position.

In machine cycles in which the lowermost motor bar 294 is not depressed, the lug 4414 of the pawl 4412 remains higher than the upper end of the lever 4409 so that the link 4406 can move forwardly and the bell crank 4402 and shaft 4401 may be rocked clockwise by the spring 4405 to move the link 4398 rearwardly and restore the latch bell crank 4395 to normal when the shaft 500, arm 4404 and stud 4403 return to normal in the machine cycle. However, in machine cycles in which the lowermost motor bar 294 is in depressed position, the forward portion of the link 4406 is lower, so that the lug 4414 is behind the upper end of the arm 4409 and will remain in that position if the lowermost motor bar 294 remains latched down beyond the end of the machine cycle. Then, if the return of the lever 4409 to normal is prevented by the stud 904 being behind the rearward projection 4415 on the lower arm of the lever 4409 because of the presence of a negative balance in the crossfooter, the upper arm of the lever 4409 holds the lug 4414 and the slide 4406 in rearward position. Through the bell crank 4402, shaft 4401, arm 4400 and link 4398, the latch bell crank 4395 is then held in latching engagement with the lug 2905 of the cycling control lever 145 and prevents initiation of a further machine cycle.

In order to complete a posting operation resulting in an overdraft balance, it is necessary for the operator to depress the error key 325 (FIG. 1) which, as disclosed in the Butler patent, operates the small motor bar latch means to release the lowermost motor bar 294, which permits the spring 4408 to elevate the forward end of the link 4406 to lift the lug 4414 clear of the upper end of the lever 4409, whereupon the spring 4405 will restore the link 4406, bell crank 4402, shaft 4401, arm 4400, link 4398 and interlock latch bell crank 4395 to normal position where the latch bell crank 4395 will not block the cycling control lever 145. The operator, after moving the paper carriage to the appropriate columnar position, may again enter on the keyboard the amount of the item which caused the balance to become overdrawn and may then depress the RT key to cause that amount to be added in the crossfooter and subtracted from the register and the count of the item to be subtracted from the count section of the crossfooter and from the count section of the register in a machine cycle initiated by a further depression of the lowermost motor bar 294. As the balance in the crossfooter amount section again becomes positive, the stud 904 returns to its upper position in line with the notch above the projection 4415 so that when the carriage again moves to the balance columnar position, the latched down motor bar 294 will automatically initiate an operation in which the positive totals will be taken from the count and amount sections of the crossfooter.

OVERDRAFT WARNING MEANS

In certain kinds of accounting work, such as checking-account posting in banks, it is desirable to bring to the attention of the machine operator a certain type of overdraft condition which would not be brought to the operator's attention by the just previously described negative total lock. For example, the operator might post a check which is for an amount very substantially larger than the old balance resulting from the last previous posting to the same account. The operator may also have for posting to the same account, a deposit of an amount equal to or greater than the difference between the old balance pick-up and the posted check so that as the paper carriage arrived in the new balance position after the deposit entering operation, the crossfooter would contain either a zero balance or a positive balance, so that the automatic new balance operation in the new balance column would not be prevented by the previously described negative total lock. The deposit involved in such a posting may be of any one of a number of varieties, some of which would not warrant return of the posted check, but others of which would, under the bank's rules applicable to checking accounts, warrant refusal to honor the check drawn on the account until after the bank had collected the deposit item or items. For example, the deposit item might be currency deposited with the receiving teller in an amount adequate to cover the drawn check, which should therefore be honored and paid. In another instance, the deposit item might be a check drawn by someone not personally known at the bank upon another bank in the same or in a different city, so that the collectibility of the deposit item may be uncertain, or, even if it is eventually collectible it might involve an improper practice which banks will not knowingly permit. For example, one person may have checking accounts under different names in two or more banks, each account having a small balance. Such person may, when temporarily pressed for funds, draw a check on the account in one bank in an amount substantially overdrawing that account, and at the same time draw a check on an account in a second bank for deposit to the account in the first bank, but also overdrawing the account in the second bank. If the first check were honored by the bank on which it was drawn, the customer would have the use of the bank's money during the delay involved in collection of the second check and might find it possible to obtain funds to deposit in the second bank to cover the check drawn on the second bank before the latter check was received by the second bank. Such practice is objectionable to banks for several reasons, and their checking account rules do not permit it. Therefore, when a check drawn on an account overdraws the balance in that account but is received immediately after receipt of a deposit item which would cover the overdraft but requires collection, the overdraft should be called to the attention of the operator so that the latter may reverse the posting of the check and transmit the check with the necessary explanation to the proper bank official for appropriate action. The present machine is provided with means for detecting such occurrences and warning the operator thereof.

The slide 905 (FIG. 21) which, as in the machine of the Butler patent, is positioned by the stud 904 in accordance with the sign of the total contained in the A crossfooter for automatically conditioning the amount pinions of the crossfooter for positive or negative total-taking in accordance with the sign of the total contained in the crossfooter, now carries in its lower end a stud 4425 which, when the slide 905 is in its lower negative total position, projects rightwardly in front of a lug 4426 on the lower end of the downward arm of a lever 4427 pivoted on a stud 4428 carried by the brace member 219. When the slide 905 and stud 904 are in their upward positive total positions, the stud 4425 is above the lug 4426 so as not to impede clockwise movement of the lever 4427. The forward arm of the lever 4427 carries a roller 4429 which is normally located in the path of the lower portion of the forward rounded end of the A crossfooter symbol indexing slide 589 which moves forwardly in each machine cycle prior to the 150° point and returns to normal subsequently to the 290° point. Thus, in each machine cycle the slide 589 depresses the roller 4429 to move the lug 4426 rearwardly of the stud 4425 prior to and holds the lug in such rearward position until after completion of operation of the front crossfooter tens-transfer mechanism in any machine cycle in which a negative total could be produced in the crossfooter. Each time the roller 4429 is so depressed, a rightwardly bent projection 4430 on the forward arm of the lever 4427 closes a self-opening switch 4431 mounted on the brace member 219. If the total in the crossfooter becomes or remains positive in the machine cycle, the stud 4425 is positioned above the lug 4426 as the slide 589 disengages from the roller 4429 so that a tension spring 4432 connected with the forward arm of the lever 4427 restores the latter to its normal limit against the stud 4425, permitting the switch 4431 to open. When, however, a negative total occurs in the A crossfooter, the slide 904 is moved downwardly to position the stud 4425 in front of the lug 4426 to hold the lever 4427 in position to keep the switch 4431 closed after the slide 589 leaves the roller 4429.

Figure 23:
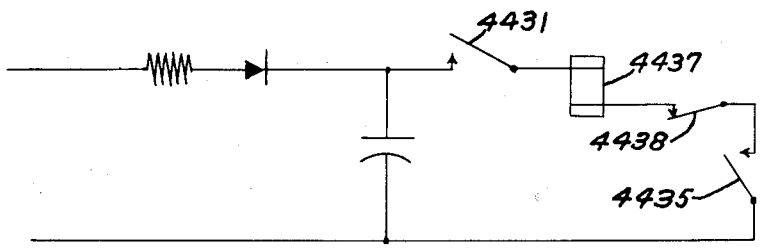
FIG. 23 is a circuit diagram of the overdraft warning means circuit.

A second self-opening switch 4435 (FIG. 22) is mounted on the front side of the rear frame plate 45 with its switch closing operating member in the path of a cam finger 4436 mounted rearwardly of the lane 25 position on that one of the bars 1750 of the function control program unit which carries the control projections 1767 for the deposit column position, the switch 4435 being so located that the cam finger 4436 closes it while and whenever the paper carriage is in the deposit columnar position. The switches 4431 and 4435, together with a self-closing and normally closed switch 4438 referred to hereinafter, are all connected, as shown in FIG. 23, in a series circuit with an electromagnet 4437 across the electrical power supply of the machine. A suitable rectifier and condenser may also be connected in the circuit, as shown in FIG. 23, to eliminate chattering of the electromagnet when the power supply is an A.C. supply, and a suitable current limiting resistor may also be included, as shown.

Figure 22:
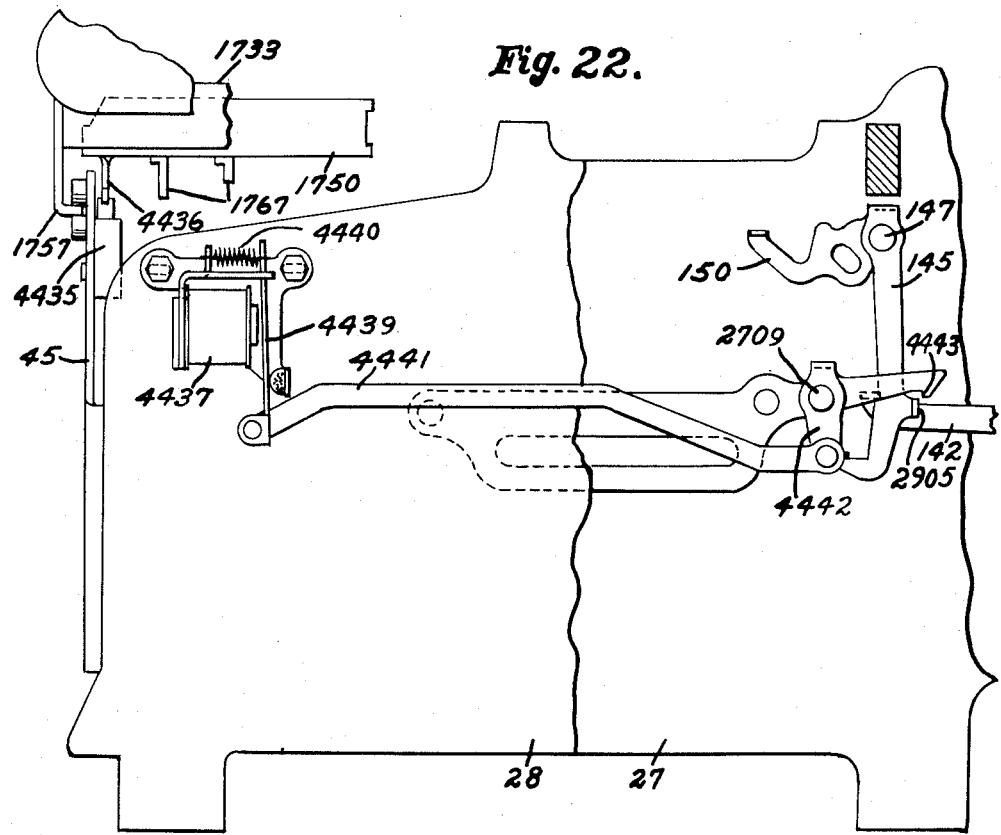
FIG. 22 is a left side elevation of other portions of the overdraft warning means.

As shown in FIG. 22, the magnet 4437, when energized, pulls an armature 4439 rearwardly against the tension of a restoring spring 4440. When the armature 4439 is pulled rearwardly it also pulls rearwardly a link 4441 pivotally connected at its rear end to the lower free end of the armature and pivotally connected at its forward end to the downward arm of a latch bell crank 4442 which is pivotally mounted on the stud 2709 and has a forward arm with a latch shoulder 4443 which is normally above the path of the lug 2905 on the machine cycling control lever 145, but is lowered to engage said lug to latch the lever 145 against cycle initiating movement when the link 4441 is pulled rearwardly by the energization of the electromagnet 4437 when the paper carriage moves into the deposit columnar position and closes the switch 4435 when an overdraft has occurred in and remains in the A crossfooter.

Thus, when the paper carriage moves to the deposit columnar position after the entry of a check which produces an overdraft of an account, the operator will find that the machine cannot be operated in the normal way for entering a deposit. The operator may enter the amount of the deposit on the amount keys and may depress the balance bar or another motor bar to initiate a machine cycle, but because of the latching of the cycling control lever 145 by the latch bell crank 4442, 4443, the machine will not cycle. The operator will then take note of the nature of the deposit item. If it is of an amount insufficient to cover the overdraft the operator will, of course, reverse the entry of the check causing the overdraft, and return that check in the usual way. Even if the amount of the deposit is sufficient to eliminate the overdraft but the deposit item is of a kind requiring collection, the operator, in accordance with the bank's rules, may also in that case reverse the entry of the check causing the overdraft and send that check and the deposit item with a suitable notation to the proper bank officer. If, however, the deposit item is one which, according to the bank's rules, may be drawn upon without delay, the operator may proceed to complete the posting in the manner next explained.

The previously mentioned self-closing and normally closed switch 4438 is mounted on the brace member 219 (FIG. 21). It is provided with an operating spring member 4445 engaged by a roller 4446 on the downward forward arm of a lever 4447 also pivotally supported on a stud 4448 secured in the brace member 219. The upper arm of the lever 4447 has a lateral projection bearing against a downward arm of a lever 4450 pivotally mounted on the end of the shaft 218. The lever 4450 has an upward arm connected to a tension spring 4451 which urges the lever 4450 clockwise to its normal position where its forward arm bears against the lower end of a stem of a release key 4452 guided in slots in the top and bottom plates 257 and 258 of the keyboard and by a guide strip 273, said release key 4452 being located just rightwardly of the B register total key 315. It will be apparent that depression of the release key 4452 will rock the lever 4450 counterclockwise against the tension of the spring 4451 to cam the lever 4447 clockwise so that the roller 4446 will operate the spring member 4445 to open the switch 4438. It will be apparent from FIG. 23 that the opening of the switch 4438 by depression of the release key 4452 will deenergize the electromagnet 4437 which in turn will permit the spring 4440 (FIG. 22) to restore the armature 4439, link 4441, and latch bell crank 4442, 4443 to normal, thereby permitting the cycling control lever 145 to rock to cycle initiating position responsive to the depressed motor bar. As there is no latch member for the key 4452, it will be restored by the spring 4451 and lever 4450 immediately when finger pressure is removed therefrom. In the machine cycle so initiated, the deposit amount previously set on the keyboard will be entered in the machine in the usual way, so that if the deposit restores a positive total in the A crossfooter the posting may be completed in the normal manner.

The machine constructed in accordance with the foregoing disclosure is admirably suited for a great variety of kinds of work. However, certain outstanding advantages will be readily apparent from consideration of the following example of one kind of work for which the present machine is eminently suited.

MODES OF OPERATION

In the following description of various modes of operation of the illustrated machine, it will be assumed by way of example that the machine is employed in a bank for the posting of customers' checking accounts, and it will be further assumed that the bank will, at the end of the month, charge each customer a service fee based on the number of checks drawn by the customer and paid by the bank during the month. The disclosed machine may be used to produce either a progressive or a non-progressive count of the checks. For the present, the production of a non-progressive count will be assumed.

FIG. 24 shows a journal sheet 4420 having thereon carbon impressions of entries printed on ledger cards or sheets in the hereinafter described illustrative posting and correction operations. It will, of course, be understood that each posting and any consequent correction thereof will be made by ribbon print on the ledger sheet for the related account, after which that ledger sheet is removed from the carriage and the ledger sheet for the next account to be posted is inserted. The ledger sheets are not shown. FIG. 24 also shows an example of a check group list produced on the tally strip 4348 in connection with one posting.

FIG. 24 also shows schematically an automatic control program set-up suitable for the kind of work involved. A brief explanation of the automatic control program at this point will minimize the amount of explanation required in the following examples of posting operations. The program control unit of the machine as disclosed in the Butler patent may be provided with control elements for a plurality of different programs selectable by rotation of the program selection control knob 1741 (FIG. 1). For the one program illustrated in FIG. 24 six column stops 1323 are provided, one for the tally strip Listing poistion, one for the old balance Pick-up columnar position, two for the Check column positions, one for the Deposit column position and one for the Balance column position.

In control lane 6 there is a #5 control projection 1767 in the Balance Columnar position so that a total taking operation will be performed on the A crossfooter. In connection with this lane 5 control, as well as in connection with the other function controls for the A crossfooter and B register, it may be mentioned that in certain instances the manually set function controls predominate over automatically set controls as explained in detail in the Butler patent. However, such instances of predominance of manual over automatic controls are of no special interest here.

In control lane 7 there are #5 control projections for the Listing position and for each of the two Check positions but none in the Pick-up position or in the Deposit position so that the A crossfooter controls will be conditioned for subtraction in machine cycles performed with the carriage in the Listing position or in either Check position but in adding condition in machine cycles performed with the carriage in the Pick-up position or in the Deposit position except as the A crossfooter functions are altered by depressions of any of the three correction keys 320, 326 and 4103 as previously described, or other A crossfooter function control keys.

There is no control projection 1767 for any columnar position in lane 8. Also, there are no control projections for any columnar positions in lanes 9, 10, and 11 so that the B register controls will normally be in condition for adding operation of any one of the B registers selected by the lane 25 control except as the B register functions are influenced by depressions of any of the three corrction keys or of other B register function control keys.

There is no control projection in the red ribbon control lane 12, so that printing will normally be in black on the ledger sheet or tally strip except in machine cycles performed with a correction key 320, 326 or 4103 or a subtract key 318 or 324 depressed, or when a negative total or subtotal is taken.

In the control lane 13 there is a #5 control projection for the second Check position, another for the Deposit columnar position, and a third for the Balance columnar position which will be effective to cause line-spacing of the platen in machine cycles initiated in any of those three columnar positions excepting machine cycles initiated by depression of either the lowermost (Balance) motor bar 294 or the uppermost (Deposit) motor bar 292 with the paper carriage in the second check and deposit columnar positions where there are also #5 control projections in lane 15. If more than one deposit entry is to be made in a posting, each except the last will be entered by a machine cycle initiated by depression of the Vertical motor bar 293.

In lane 14 there is a #5 control projection in the Balance columnar position to cause the paper carriage to open in a machine cycle performed with the carriage in that columnar position.

In lane 16 there is a #5 control projection in the Balance columnar position to place the B register controls in subtract position during a total-taking operation of the A crossfooter if the total taken from the A crossfooter is negative, but not otherwise.

In lane 17 there are #7 control projections in the Pickup and Deposit positions to cause automatic accumulation of counts only in the B registers selected by the lane 25 controls, but not in the crossfooter, in machine cycles initiated in those columnar positions.

In lane 18 there are #5 control projections in the Pickup columnar positions, in both Check positions and in the Deposit position, so that when a machine cycle is initiated by depression of the balance bar 294 with the carriage in any of those four columnar positions, the depressed Balance bar will remain latched down at the end of such a machine cycle and will automatically initiate another machine cycle when the carriage comes to rest in another (the Balance) columnar position.

There are no control projections in lane 21 as automatic machine cycles other than those following machine cycles initiated by depression of the balance bar 294 are not needed for the work program under consideration.

In lane 22 there is an assortment of control projections to effect selective hammer blocking to cause printing of only counts and amounts and crossfooter function symbols in the Listing position, counts, amounts and crossfooter and register function symbols in the Pick-up column, amounts, crossfooter function symbols and designation characters in each of the two Check positions, and in the Deposit position, and dates, counts, amounts, and crossfooter function symbols in the Balance position.

Lane 23 is unused in the illustrated machine.

In lane 24 there are #4 control projections in the Listing position and in each of the two Check positions to effect automatic accumulation of counts in both the crossfooter and the active register in machine cycles initiated with the carriage in each of those three postions.

In lane 25 there is a #5 control projection in the Listing position and in each of the two Check positions to select the #2 B register for operation in machine cycles initiated in each of those three carriage positions. Also in lane 25 there is a #3 control projection in the Deposit position, a #1 control projection in the Balance position, but no control projection in the Pick-up position, so that the #1 register will not be displaced from active position in a machine cycle initiated with the carriage in Pick-up position, the #3 register will be shifted to active position in each machine cycle performed with the carriage in the Deposit position, and the #4 register will be active in machine cycles performed with the carriage in the Balance position.

The automatic carriage movement controls are best considered collectively. Skip-tabulating movements of the paper carriage in machine cycles initiated by depression of the Deposit bar 292 with the carriage in any position preceding the Deposit position will be terminated in the Deposit columnar position because of the presence of the long projection 1784 between the second Check position and the Deposit position in lane 1. Return movements in cycles initiated by depression of the crossfooter subtotal key 322 with the carriage in the first Check position or by the Balance bar with the carriage in the Balance position will be terminated in the Pick-up position because of the long projection 1784 in lane 2 between the first Check position and the Pick-up position.

The short control projection 1783 in lane 3 in each carriage position except the Balance position, in conjunction with the #5 control projection in lane 15 in each of the same carriage positions excepting the first Check position, and in conjunction with the #5 control projection in lane 20 in the first Check position, secures the result that in machine cycles initiated by depressions of the Balance bar 294 with the paper carriage in any of those five columnar positions the carriage will skip-tabulate under lane 3 control. Likewise the carriage will skip-tabulate under lane 3 control in a machine cycle initiated by depression of the A crossfooter subtotal key 322 with the carriage in the Listing position but will effect a lane 2 controlled return movement in a machine cycle initiated by depression of the same key 322 with the paper carriage in the first Check position. The lane 3 control movements in the tabulating direction from either the Listing position or the Pick-up position will be terminated by arrest of the paper carriage in the first Check position by reason of the location of a long projection 1783 in lane 3 between the Pick-up and first Check positions.

In lane 5 there are control projections 1783 in both the second Check position and the Deposit position so that in machine cycles initiated by depressions of the main (Check) motor bar 291 with the carriage in either of those two positions the carriage will effect a lane 5 controlled return movement which will be terminated by arrest of the paper carriage in the first Check position by reason of the presence of a long projection 1783 in lane 5 between the two check positions.

The #7 control projection in the first Check position in lane 15 will prevent line spacing in machine cycles initiated by depression of the crossfooter subtotal key 322 or the Balance bar 294 with the carriage in the first Check position.

In lane 19 there is a #5 control projection in the Listing position so that in machine cycles initiated with the carriage in that columnar position otherwise than by depression of the A crossfooter subtotal key 322, the balance bar 294, or the deposit bar 292, the carriage tabulating mechanism will be disabled.

In a normal example of posting there may be either one or more checks or one or more deposits, or one or more of each to be entered, as in the example of posting A in FIG. 24. A posting is started with the paper carriage in the Pick-up columnar position with the front or A crossfooter clear. From the ledger sheet the operator reads the last previous balance of 200.00 and enters that old balance on the amount keys by depressing the "2" key in key row 5. If there were only one or more deposits but no checks to be entered, the operator would initiate the machine cycle by depression of the uppermost or Deposit bar which in the ensuing machine cycle would cause the carriage to perform a lane 1 control skip-tabulation to the Deposit column. However, noting that there are checks to be entered, the operator will initiate the old balance entering machine cycle by depression of the main (Check) motor bar 291 so that after the amount of the old balance is printed in the Pick-up column and added in the amount sections of the crossfooter and the #1 register, and the Pick-up operation is counted in the count section of that register in the machine cycle, the carriage will tabulate to the next columnar position which is the first of the two Check columnar positions. Then the operator enters on the amount section of the keyboard the amount of the first check, i.e., 10.00. If there were no further entry to be made, the operator would initiate the machine cycle by depression of the Balance bar 294 so that in the ensuing machine cycle the carriage would perform a skip tabulation directly to the Balance column, as will be explained in connection with a later example. If the operator observed that there were no further checks but only a deposit to be entered, the operator would initiate the machine cycle by depression of the uppermost Deposit bar 292 which, in the resulting machine cycle would cause the paper carriage to perform a lane 1 controlled skip-tabulation to the Deposit column. Noting that there is a second check to be entered, the operator will initiate the machine cycle by depression of the Check motor bar 291, so that the amount of the first check will be printed in the first Check column, subtracted from the amount section of the crossfooter, and added in the amount section of the #2 register and the check is automatically counted in the count sections of the crossfooter and the #2 register, and the paper carriage will tabulate to the second Check columnar position. Then the operator will enter the amount of the second check, i.e., 20.00, on the amount section of the keyboard. Again, if there were no further entries to be made, the operator would initiate the machine cycle by depression of the Balance bar 294. However, noting that there is no further check but that there is a deposit to be entered, the operator will initiate the machine cycle by depression of the uppermost Deposit bar 292 so that the amount of the second check will be printed in the second Check column, subtracted from the amount section of the crossfooter and added in the amount section of the #2 register and the check is automatically counted in the count sections of the crossfooter and the #2 register, and the paper carriage will tabulate under lane 1 control to the Deposit columnar position. Then the operator enters the amount of the deposit, i.e., 30.00, on the amount section of the keyboard, and noting that there is no further entry to be made, will initiate the machine cycle by depression of the Balance bar 294 so that the amount of the deposit will be printed in the Deposit column, added in the amount sections of the crossfooter and the #3 register, the deposit will be counted in the count section of that register, and the paper carriage will tabulate under lane 3 control to the Balance column. The balance bar will remain latched down as the paper carriage moves into the Balance columnar position and will automatically initiate a further cycle of operation with the carriage in the latter position unless that operation is prevented by the negative total lock previously described. In that automatic cycle of operation the automatic total-taking operation of the crossfooter results in the printing of the new balance of the account, i.e., 200.00, and the total count of the checks entered, i.e., 2. Those count and amount totals will be added in the count and amount sections of the #4 register. The paper carriage will open, the platen will be line-spaced, and, due to the Balance bar 294 being in depression position, in the balance printing operation, the paper carriage will perform a lane 2 control return movement to the Pick-up columnar position.

As the paper carriage arrives again in the Pick-up columnar position with the carriage open, the operator may withdraw the posted ledger sheet and insert the ledger sheet for the next account to be posted. In the posting example B, the pick-up old balance and the two checks are posted in the same manner as described with reference to example "A" except that the operator, after entering the amount of the second check on the amount section of the keyboard and noting that there is no further entry for that account, will initiate the second check entering operation by depression of the Balance bar 294 so that after the printing of the amount, i.e., 50.00, of the second check in the second Check column, the paper carriage will perform a lane 3 controlled skip-tabulation to the Balance columnar position where the latched-down Balance bar would normally automatically initiate a balance printing operation as described in connection with example "A." However, it will be noted that the combined amounts of the two checks entered in posting "B" exceeds the pick-up old balance so that the crossfooter is in overdrawn condition. Consequently the previously described negative total lock will prevent the automatic initiation of the balance printing machine cycle. In connection with this posting it will be assumed that it is the policy of the bank to permit small overdrafts in certain accounts readily identifiable by the operator, and that posting "B" involves such an account. In that event the operator will depress the general error key 325 which will release the latch-down Balance bar 294 and permit it to restore to normal. The restoration of the Balance bar 294, as previously described, permits the negative total lock to release so that upon redepression of the Balance bar the machine will perform the balance printing operation to print the correct check count, i.e. 2, and the overdraft balance of 25.00. As in the machine of the Butler patent, the overdraft total will be printed in red with the symbol "OD" and the lane 16 control will condition the active #4 register for subtraction so that both the overdraft amount balance and the check count will be subtracted from the amount and count sections, respectively, of the #4 register. The net accumulation in the amount section of the register will, therefore, be correct but the count accumulated in the register will be incorrect. However, that error can easily be corrected, if desired, by placing the paper carriage in the Balance position, entering the complement of the register count error on the count keys, depressing the crossfooter non-add key and initiating a machine cycle by depression of the Balance bar 294. The lane 16 control will again condition the register to subtract the complement of the count correction which produces the same result as adding the count correction. If such correction is to be made, the overdraft balance printing operation should be initiated by depression of the Vertical motor bar 293 to avoid movement of the carriage out of the Balance position and the subsequent need to return it to that position.

If it were the policy of the bank not to permit overdrafts, the posting, as shown in Example C, would have proceeded in the same manner as in Example B to the point where, with the paper carriage in the Balance columnar position, the machine failed to cycle automatically to print the balance. To correct the overdraft the operator would depress the error key to release the Balance bar, but instead of redepressing the latter, the operator would return the paper carriage to the second Check columnar position and manually line-space the platen. Then the operator would enter on the keyboard the amount of the smallest check equal to or greater than the overdraft, which in this case is the $50.00 check, and, after depressing the correction key 4103, would redepress the Balance bar 294. Because of the key 4103 being in depressed position in the machine cycle so initiated, the crossfooter would be in adding condition and the active #2 register would be in subtracting condition, so that the amount of 50.00 would be added in the crossfooter and subtracted from the #2 register and an automatic count correction would be effected by subtracting 1 from the count sections of both the crossfooter and the #2 register. The paper carriage would perform a lane 3 controlled skip-tabulation to the Balance columnar position where a balance printing machine cycle would be initiated automatically to print the corrected count 1 and the corrected balance 25.00.

In posting "D" the operator finds a group of checks clipped to a pre-list showing four checks the amounts of which add up to $54.00, and a number of other checks. Assume that the operator's instructions are that when a number of non-prelisted checks are encountered, a list is to be prepared and the checks are to be clipped to that list and the total amount and total count of the thus listed checks is to be entered in a single operation in one of the Check columns. The operator will then move the carriage to the Listing position to align the amount and count printing types with the tally strip, and initiate a machine cycle by depression of the crossfooter total key 321 (FIG. 1) to print the ".00*" clear indication at the top of the list. In the machine cycle initiated by depression of the total key with the carriage in the Listing columnar position, the carriage will remain stationary and the line-spacing mechanism will operate to line-space the tally strip. Then the operator will enter the amounts of the individual checks in successive machine cycles initiated by depression of the main motor bar 291. The amounts of these checks will be subtracted from the amount section of the crossfooter and added in the amount section of the #2 register, and each check will be counted additively in the count sections of both the crossfooter and the #2 register. When the last check has been thus listed the operator will depress the crossfooter subtotal key 322 which will initiate a machine cycle in which the paper carriage will perform a lane 3 controlled skip-tabulation to the first Check position after printing the count and amount totals of the listed checks on the tally strip by a subtotal-taking operation of the crossfooter. In this cycle of operation the register is non-added by the depression of the crossfooter subtotal key 322 so that there will be no double entry of counts and amounts of the checks in the #2 register.

The operator continues to hold the subtotal key 322 depressed as the paper carriage moves to the first Check columnar position, so that, as the carriage comes to rest, another crossfooter subtotal-taking operation will be initiated to print the amount total of the listed checks in the first check columnar position. The lane 22 printing control suppresses printing of counts. In this cycle of operation of the machine the register will be non-added because of the depression of the subtotal key 322, and the paper carriage will move in the return direction to the Pick-up columnar position because the depressed crossfooter subtotal key 322 disables the lane 20 control and permits the carriage return control yoke 1531 to remain in the effective position to which it is moved by the forward movement of the link 1573 caused by the depression of the subtotal key 322. Again, the total amount and total count of the listed checks will not be entered in the #2 register normally active in this position because the register is non-added by the depression of the subtotal key 322. Also, the lane 24 controlled count mechanism will be disabled by reason of the bail 968 holding all of the differential stop slides 483 in their normal "9" positions.

When the paper carriage has returned to the Pick-up columnar position, the operator enters the amount of the old balance, i.e. 150.00, and noting the prelisted second group of checks to be entered, will initiate the machine operation by depression of the Check motor bar 291 so that after printing of the pick-up balance in the Pick-up column the paper carriage will tabulate to the first Check columnar position. Here the operator may hold the Check motor bar down to cause the machine to perform a blank cycle in the first Check columnar position and cause the paper carriage to tabulate to the second Check position. When the paper carriage arrives in the second Check position the operator will enter the total amount of the second group of checks on the amount section of the keyboard and the amount of the prelisted second group on the count section of the keyboard and then, noting that there is no further entry to be made, will initiate a machine cycle by depression of the Balance bar 294 so that the total amount of the prelisted group of checks will be printed, subtracted from the amount section of the crossfooter, added in the amount section of the #2 register and the group count entered on the count keys 255 will be added in the count sections of the crossfooter and #2 register, and the paper carriage will tabulate to the Balance columnar position, after which an automatically initiated total-taking operation of the crossfooter will print the new balance together with the total count of the two groups of checks and add them in the #4 register.

At this point, let it be assumed that the operator notes that in entering the total count and total amount of the pre-listed group of checks two errors were committed, in that the group count of the prelisted group of checks should have been 4 instead of 3, and the total amount should have been 54.00 instead of 34.00. With the paper carriage in the Pick-up position the operator will then enter the incorrect new balance of 31.00 and count total 7 on the amount and count keys and operate the machine in the normal manner by depression of the Check motor bar 291. When the paper carriage arrives in the first Check columnar position, the operator will reenter the previously incorrectly entered group count of 3 on the count keys and incorrect group amount total of 34.00 on the amount keys, and will depress the EC key 326 which will hold the crossfooter function controls in adding condition and will place the register function controls in subtracting position. Depression of the EC key 326, as previously explained, also conditions the count section of the crossfooter for subtraction. In the machine operation initiated by depression of the Check motor bar 291 the re-entered incorrect group amount will be added in the crossfooter and the previously re-entered incorrect group count will be subtracted from the count section of the crossfooter. Both the re-entered group count and the amount will be subtracted from the count and amount sections of the #2 register. In this machine cycle the paper carriage will tabulate to the second Check position, whereupon the operator will now enter the correct group count 4 and amount 54.00 on the keyboard and initiate the machine cycle by depression of the Balance bar 294. In that cycle, the correct group count and amount will be added in the count and amount sections of the #2 register, leaving the totals in that register correct, the correct count will be added in the count section of the crossfooter, and the correct amount will be subtracted from the amount section of the crossfooter. After printing is effected, the paper carriage will tabulate to the Balance columnar position and the machine will cycle automatically to total the crossfooter and print the correct balance of 11.00 and the correct count total of 8 in the balance column.

To effect the necessary correction in the amount totals in the #1 register and #4 register, the operator will again enter the incorrect balance of 31.00 on the keyboard and depress the crossfooter subtract bar 318 and the register subtract bar 324 simultaneously to initiate a machine cycle in which the incorrect new balance in the first line of posting "D" will be simultaneously subtracted from the crossfooter and the #1 register, thereby leaving the amount accumulation in the #1 register correct. The carriage will tabulate to the first Check position. Then the operator will move the paper carriage to the Balance columnar position by depressing the carriage tabulating key and will then depress the Balance bar 294 to initiate a cycle of operation in which the crossfooter is totaled. This cycle of operation will not be prevented by the negative total lock because the Balance bar 294 was not held down from a previous cycle of operation. Because of the negative total-taking operation of the crossfooter in conjunction with the #5 control projection in the Balance position in lane 16, the amount 31.00 of the incorrect balance drawn from the crossfooter will be subtracted from the #4 register, thereby leaving the amount accumulation in that register correct. It will be apparent that, if the incorrect count total of 7 were also again entered on the count keys simultaneously with the second entry of the incorrect amount balance on the amount keys, the error in count accumulation in the #4 register would be eliminated and that in the #1 register reduced to 2 resulting from the two extra operations of the lane 17 controlled count means.

In Example "E" it is assumed that the operator, immediately after entering the 5.00 check in the first Check position and before operating the machine to enter the 15.00 deposit, notes that the check is for a different account and has therefore been incorrectly charged. The operator will then return the paper carriage to the second Check position, re-enter the 5.00 amount, depress the EC key 326, and operate the machine by depression of the Deposit bar 292 which will cause the paper carriage to move to the Deposit column after the correction has been printed in the second Check column. Then the 15.00 deposit will be entered in a machine operation initiated by depression of the Balance bar 294 so that, after the printing of the amount of the deposit in the Deposit column, the paper carriage will tabulate to the Balance columnar position where an automatic balance printing operation will be performed and the paper carriage will return to the Pick-up columnar position. In the error correcting entry in the second check position the crossfooter function controls will be held in adding position while the count section of the crossfooter will be placed in subtract condition and the register function controls will be conditioned for subtraction, so that an automatic unit count will be subtracted from the register as well as from the crossfooter, with the result that the count total obtained in the new balance operation will be "0," which will not be printed.

In Example F the operator, after completing a posting involving the entry of a 5.00 check in the first Check position, discovers that the amount should have been entered as a deposit instead of as a check. The procedure for effecting the correction is the same as in Example B except that there is no group count involved to be entered on the count keys.

In Example G it is assumed that the bank's policy is to enter all checks individually, as shown. However, the operator makes an error by entering a 125.00 deposit as 25.00 and completes the posting to print the incorrect new balance of 425.00 with a check count of 4. After discovering the error the operator enters the incorrect balance of 425.00 on the amount keys and the check count of 4 on the count section of the keyboard and initiates a machine cycle by depression of the Deposit bar 292. After the printing in the Pick-up column, the paper carriage skip-tabulates under lane 1 control to the Deposit columnar position where the operator re-enters the previously entered incorrect amount of the deposit (25.00), depresses the DC key 320 and initiates a machine cycle by depression of the Balance bar. In this machine cycle the crossfooter and register function controls are both placed in subtraction condition and the lane 17 control register count mechanism is placed in subtractive position by depression of the DC key 320 so that the count and amount totals in the #3 register are restored to the values existing prior to the incorrect deposit entry. The operator will then initiate a cycle of operation by depression of the Vertical bar 293 which will cause the paper carriage to remain in the deposit columnar position and the platen to be line-spaced after the printing of the correction entry. Then the operator will enter the correct amount of the deposit, i.e. 125.00, and initiate the machine cycle by depression of the Balance bar. After the printing of the correct balance and correct count in the Balance column, the paper carriage will return to the Pick-up position, after which the operator will re-enter the incorrect new balance to correct the totals in the #1 and #4 registers, as in Example D.

In Example H, a deposit of 15.00 is incorrectly entered as a check and a check of 25.00 is incorrectly entered as a deposit. Both errors are corrected in a single correction posting performed in a manner which should be obvious from the previous explanation.

In Example I the operator picks up an old balance of 90.00 and enters two checks, one of 250.00 and the other of 25.00. The operator initiates the machine cycle for entering the amount of the second check by depression of the deposit bar because there is a deposit item of 200.00 to be entered, so that after the printing of the amount of the second check the paper carriage tabulates to the deposit column. Then the operator enters the amount of the deposit on the amount keys and, noting that there is no further item to be posted, depresses the balance bar 294. However, the machine does not cycle, thereby notifying the operator that at least one of the checks posted has produced an overdraft. The operator then considers the character of the deposit item and notes that it is of a kind requiring collection. The operator then depresses the error key 325 to restore the depressed motor bar as well as the depressed amount keys and returns the paper carriage to the second check position where the amount of the 250.00 check which caused the overdraft is entered on the amount keys, and the RT key 4103 is depressed, after which the operator depresses the balance bar 294 to initiate a machine cycle in which the amount of the check is added in the A crossfooter, subtracted from the #2 B register, while the count of 1 is subtracted from the crossfooter count section and from the #2 register count section. After the Printing of the returned check amount of 250.00 with the symbol + RT, the paper carriage skip-tabulates to the balance column where the balance printing operation is automatically initiated, as previously described.

If, in Example I, the character of the deposit had been such as to warrant honoring the check which produced the temporary overdraft, the operator could have completed the posting by merely depressing the release key 4452 which would have opened the switch 4438 and de-energized the electromagnet 4437 to permit initiation of the machine cycle. The machine cycle would have been initiated immediately by the latch-down balance bar 294 to complete the posting in the usual manner, inasmuch as the entry of the deposit amount would have restored the A crossfooter to positive total condition so that the negative total lock shown in FIG. 20 would not interfere with the automatic balance operation with the paper carriage in the balance position.

At the end of a work period or posting run, the illustrated machine may, like the machine of the Butler patent, be conditioned by rotation of the program control knob 1741 to render effective an automatic program of register totaling operations which will result in the printing of the count and amount totals from each of the several registers.

At the time of completing each customer's statement form for the accounting period, the counts printed in the Balance column of the ledger, omitting incorrect counts and the register correcting count entries, will be totaled to determine a service charge which may be entered as a final posting on the statement form. When an error occurs in the preparation of the statement form, the statement form may either be re-done correctly or the incorrect old balance pick-ups and incorrect new balances together with incorrect counts and register correcting count and amount entries in the Balance column may be struck out with pen and ink.

As mentioned previously, instead of effecting item counts non-progressively as described above, progressive counts may be maintained. In that event the operator will, at the time of entering an old balance amount pick-up on the amount keys with the paper carriage in the Pick-up columnar position, also enter a previous count total on the count keys. After the entry of all the items to be posted, the crossfooter total-taking operation with the carriage in the Balance columnar position will result in the printing not only of new amount balance, but also the new count total to date, including both the previous count total and the count of the items entered in such posting, and both of these figures will again be entered in the Pick-up column at the beginning of the next posting to the same account. Thus the print in the balance column at the end of the last posting in the accounting period will show not only the final amount balance, but also the total count of chargeable items for the accounting period. In general, the various correcting operations which may be necessary to correct the errors of the operator may be performed in the same manner as described above.

It is believed that the foregoing examples are sufficient to illustrate the advantages of the new counting and control mechanisms of the present invention. It will, however, be readily appreciated by those skilled in the art that the disclosed machine may be used with advantage for a great variety of kinds of work and may be embodied in other equivalent forms in various accounting machines.

We claim:

1. An accounting machine having a totalizer comprising an amount section and a count section each comprising a plurality of orders of accumulating pinions, amount entering means comprising reciprocable amount differential actuators cooperable with said amount section pinions for entering amounts additively or subtractively therein, function control means conditionable to select additive or subtractive operation of the amount section pinions by said amount entering means, means cooperable with said count section and activatable to enter a count therein additively or subtractively, a traveling carriage movable to any of a plurality of positions, means controlled by said carriage in accordance with its position to activate said count entering means, means conditionable to determine the additive or subtractive operation of the count section pinions by said count entering means and normally conditioned for additive count entry upon activation of said count entering means when said function control means is conditioned for either additive or subtractive amount entry, and means to condition said last-named conditionable means for subtractive operation of said count entering means.

2. An accounting machine having a totalizer comprising an amount section and a count section each comprising a plurality of orders of accumulating pinions, amount entering means comprising reciprocable amount differential actuators cooperable with said amount section pinions for entering amounts additively or subtractively therein, function control means conditionable to select the algebraic sense of operation of the amount section pinions by said amount entering means, a traveling carriage movable to any of a plurality of positions, means controlled by said carriage in accordance with its position to operate said function control means, means cooperable with said count section and activatable to enter a count therein additively or subtractively, means controlled by said carriage in accordance with its position to activate said count entering means, means conditionable to determine the additive or subtractive operation of the count section pinions by said count entering means and normally conditioned for additive count entry upon activation of said count entering means when said function control means is conditioned for either additive or subtractive amount entry, and manipulative means to condition said last-named conditionable means for subtractive operation of said count entering means and condition said function control means for an amount entering operation of the algebraic sense reversed to that for which it would be conditioned by said carriage-controlled means.

3. An accounting machine having a totalizer comprising an amount section and a count section each including pinions for a plurality of orders, reciprocable differential actuators for each of the orders of each section, said totalizer having supporting means for the pinions of both sections movable to engage pinions of both sections with and disengage them from their actuators in unison, means for moving said supporting means to engage and disengage the pinions and actuators in one mode to effect addition on the pinions of the amount section and in another mode to effect subtraction on the pinions of the amount section, control means to condition said moving means for either of said modes of engagement and disengagement, the pinions of the count section being shiftable on said supporting means relatively to the pinions of the amount section to a position for rotation of said count pinions by their actuators in the direction of rotation of the pinions of the amount section by their actuators and to a position for rotation of said count pinions by their actuators in a direction reverse to the rotation of the pinions of the amount section by their actuators, and means to shift the pinions of the count section to either position while said control means conditions said moving means for either mode of engagement and disengagement.

4. An accounting machine having a totalizer comprising an amount section including a plurality of orders of pinions, reciprocable amount differential actuators cooperable with said amount section pinions in one mode for adding amounts on said pinions and in another mode for subtracting amounts from said pinions, said totalizer also comprising a plural order count section including pinions arranged in two groups each comprising a pinion for each count section order with each pinion of one group interconnected with the pinion of like order of the other group for reverse synchronous rotation of the two pinions of each order, reciprocable count actuators for said count orders cooperable with either group of count pinions simultaneously with the cooperation of the amount pinions with the amount actuators, and means to select either group of count pinions for rotation by said count actuators to enter count values in said count section in the alegbraic sense corresponding or opposite to the algebraic sense of the simultaneous amount entry on the amount pinions.

5. An accounting machine having a totalizer comprising an amount section including a plurality of orders of pinions, reciprocable amount differential actuators cooperable with said amount section pinions in one mode for adding amounts on said pinions and in another mode for subtracting amounts from said pinions, said totalizer also comprising a plural order count section including pinions arranged in two groups each comprising a pinion for each count section order with each pinion of one group interconnected with the pinion of like order of the other group for reverse synchronous rotation of the two pinions of each order, reciprocable count differential actuators for said count orders cooperable with either group of count pinions simultaneously with the cooperation of the amount pinions with the amount actuators, means to select either group of count pinions for rotation by said count actuators to enter count values in said count section in the algebraic sense corresponding or opposite to the algebraic sense of the simultaneous amount entry on the amount pinions, and control means operable to select the subtracting mode of cooperation of the amount pinions with the amount actuators and select, for cooperation with the count actuators, the group of count pinions for a count entry in the opposite algebraic sense.

6. An accounting machine having a carriage movable to any of a plurality of positions, a totalizer comprising an amount section including a plurality of orders of pinions, amount differential actuators for each of said orders, means conditionable to cause cooperation of said amount pinions with said amount actuators in one mode for adding amounts on said amount pinions and in another mode for subtracting amounts from said amount pinions, said totalizer also comprising a plural order count section including pinions arranged in two groups each comprising a pinion for each count section order with each pinion of one group interconnected with the pinion of like order of the other group for reverse synchronous rotation of the two pinions of each order, count actuators for said count orders cooperable with either group of count pinions simultaneously with the cooperation of the amount pinions with the amount actuators, means conditionable to select either group of count pinions for rotation by said count actuators to enter count values in said count section in the algebraic sense corresponding or opposite to the algebraic sense of the simultaneous amount entry on the amount pinions, means controlled by said carriage to condition said causing means and said selecting means to cause cooperation of the amount pinions with the amount actuators in the subtracting mode and selection of the group of count pinions for a count entry in the opposite algebraic sense in at least one of said carriage positions, and manipulative control means operable while the carriage is in said position to condition said causing means and said selecting means to cause cooperation of the amount pinions with the amount actuators in the adding mode and selection of the group of count pinions for a count entry in the opposite algebraic sense.

7. An accounting machine having a carriage movable to any of a plurality of positions, a totalizer comprising an amount section including a plurality of orders of pinions, amount differential actuators for each of said orders, means conditionable to cause cooperation of said amount pinions with amount actuators in one mode for adding amounts on said amount pinions and in another mode for subtracting amounts from said amount pinions, said totalizer also comprising a plural order count section including pinions arranged in two groups each comprising a pinion for each count section order with each pinion of one group interconnected with the pinion of like order of the other group for reverse synchronous rotation of the two pinions of each order, count actuators for said count orders cooperable with either group of count pinions simultaneously with the cooperation of the amount pinions with the amount actuators in either mode, means conditionable to select either group of count pinions for rotation by said count actuators to enter count values in said count section in the algebraic sense corresponding or opposite to the algebraic sense of the simultaneous amount entry on the amount pinions, means controlled by said carriage to condition said causing means and said selecting means for cooperation of the amount pinions and actuators in the adding mode and selection of the group of count pinions for a count entry in the same algebraic sense in at least one of said carriage positions and to condition said causing means and said selecting means for cooperation of the amount pinions and actuators in the subtracting sense and selection of the group of count pinions for a count entry in the opposite algebraic sense in at least another of said carriage positions, a manipulative control means operable with the carriage in said one position to place said causing means and said selecting means each in the condition reversed to that in which it would be placed by said carriage-controlled means in said one carriage position, and a further manipulative control means operable with the carriage in said other carriage position to place said causing means and said selecting means each in the condition reversed to that in which it would be placed by said carriage-controlled means in said other carriage position.

8. An accounting machine having a totalizer, an amount section including amount pinions for a plurality of orders, and a count section including two groups of pinions, each group including a pinion for each count order interconnected with the count pinion of like order of the other group for rotation in reverse synchronous relation to the interconnected pinion, differential actuators for each of the amount and count orders reciprocable from a normal position to differential value positions and again to normal position, said totalizer comprising movable means to support the pinions of both sections for simultaneous movement into and out of engagement with the respective actuators, said two groups of count pinions being shiftably supported by said supporting means for relative shifting of said groups to position either group of count pinions for engagement with the count actuators upon engaging movement of said supporting means while said interconnection is maintained, means conditionable to move said supporting means to effect engagement while the actuators are in their differential positions and disengagement after they have returned to normal to add an amount on said amount section pinions and conditionable to effect engagement while the actuators are in normal position and disengagement after they have reached and while they are in their differential positions to subtract an amount from said amount pinions, and means to effect relative shifting of said groups of count pinions to position the count pinions of one group for engagement with their actuators to effect entry of a count value in the same algebraic sense as the amount entry on the amount pinions and to position the count pinions of the other group for engagement with the actuators for entry of a count value in the algebraic sense reversed to that of the amount entry on the amount pinions.

9. A machine according to claim 8, having total-taking control means operable to condition said moving means to effect pinion-and-actuator engagement and disengagement in the amount subtracting mode and to permit movement of said count and amount actuators from normal positions sufficient to rotate the engaged pinions to 0, means controlled by said total-taking control means to arrest the count and amount pinions at 0, and means controlled by said total-taking control means to control said shifting means to position said one group of count pinions for engagement with the count actuators in the total-taking operation.

10. A machine as claimed in claim 8, wherein said moving means is normally conditioned to effect pinion and actuator engagement and disengagement in the mode to add an amount on the amount pinions, and the count pinion group shifting means normally positions for engagement with the count actuators that one of the groups of count pinions which will effect a count value entry on the count pinions in the same algebraic sense as that of the amount entry on the amount pinions, and having function control means to condition said moving means to effect pinion and actuator engagement and disengagement in the mode to subtract an amount from the amount pinions and simultaneously condition said shifting means to position for engagement with the count actuators the other group of count pinions to effect a count value entry on the count pinions in the algebraic sense reversed to that of the amount entry.

11. A machine acccording to claim 10, having a carriage movable to any of a plurality of positions, means controlled by said carriage to operate said function control means to condition said moving means for amount subtracting pinion-and-actuator engagement and disengagement and simultaneously condition said shifting means to position said other group of count pinions for engagement with the count actuators to effect additive entry of a count value while said carriage is in a predetermined position, and a manipulative control means operable when said carriage is in said predetermined position to prevent said carriage-controlled means from operating said function control means and to condition said shifting means to position said other group of count pinions for engagement with the count actuators to effect subtractive entry of a count value.

12. A machine according to claim 10, having a carriage movable to any of a plurality of positions, means controlled by said carriage to operate said function control means to condition said moving means for amount subtracting pinion-and-actuator engagement and disengagement and simultaneously condition said shifting means to position said other group of count pinions for engagement with the count actuators to effect additive entry of a count value while said carriage is in a predetermined one of its positions but not when said carriage is in another of its positions, and a manipulative control means operable when said carriage is in said other position to operate at least a portion of said function control means to condition said moving means for subtractive amount entering pinion-and-actuator engagement and disengagement while leaving said shifting means in normal condition to position said one group of count pinions for engagement with the count actuators to effect subtractive entry of a count value.

13. An accounting machine having a totalizer including a plural order amount section and a plural order count section, each section having two groups of pinions, each group in each section including a pinion for each order of the section, reciprocable amount differential actuators for each of the orders of said amount section, reciprocable count differential actuators for each of the orders of said count section, said totalizer comprising movable means to support the pinions of both sections for simultaneous movement into and out of engagement with the corresponding reciprocable actuators, the two groups of pinions of the amount section being mounted on said supporting means for relative movement of said groups to position the pinions of either one of said groups for engagement with said actuators upon engaging movement of said supporting means, and the two groups of pinions of the count section being mounted on said supporting means for relative movement of said groups independently of the relative movement of the amount pinion groups to position either group of count pinions for engagement with their actuators upon engaging movement of said supporting means, each pinion of each group of each section being constantly interconnected with the pinion of like order of the other group of the same section for rotation of each pinion in reverse synchronous relation to the interconnected pinion.

14. An accounting machine having cyclically operable general operating mechanism, value entering means including value differential actuators reciprocable in a cycle of operation from a normal "0" position to value differential positions and again to "0" position, a totalizer having a counting section and an amount section comprising a line of pinions, means for engaging and disengaging said line of pinions with and from said actuators to effect rotation of said pinions by said actuators during the movement of the latter in one of the directions of said reciprocation to effect additive entries in said pinions but during movement of the actuators in the other of the directions of said reciprocation to effect subtractive entries in said pinions, function control means to condition said engaging and disengaging means for either of said modes of entry, transfer mechanism for each of said sections of said totalizer including a transfer member for each pinion and means controlled from the pinion of next lower order to operate said transfer member to rotate its pinion to enter a unit thereon, means controllable to cause operation of said transfer members to be in one direction to add said units on their pinions or in the reverse direction to subtract said units from their pinions, and means to set said controllable means for the counting section for either additive or subtractive entry of units in said counting section independently of the mode of entry in the amount section determined by said function control means, and means operable by said operating means in a cycle of operation to cause operation of the transfer member for the pinion of lowest order of the counting section for entering a unit on the latter pinion.

15. A machine according to claim 14, having means to normally maintain the controllable means for the transfer mechanism of the counting section in condition for additive unit entry, and having means operable to reverse the condition of said function control means to change modes of entry in said amount section and condition said setting means for the transfer mechanism of the counting section for subtractive entry.

16. A machine according to claim 14, having means normally maintaining said controllable means for the transfer mechanism of the counting section in condition for additive entry of units in said counting section, a carriage movable to any of a plurality of positions, means controlled by said carriage to condition said function control means for entry in a predetermined one of said modes in said amount section in at least one of said positions of said carriage, and manipulative means operable with said carriage in said one position to condition said function control means for entry in the other of said modes in said amount section and to condition said setting means for subtractive entry.

17. A machine according to claim 14, having means to normally maintain the controllable means for the transfer mechanism of the counting section in condition for additive unit entry in the counting section, a carriage movable to any of a plurality of positions, means controlled by said carriage to condition said function control means for additive entries in said amount section in at least one position of said carriage and for subtractive entry in said amount section in at least one other position of said carriage, manipulative means operable with said carriage in said one position to condition said function control means for subtractive entry in said amount section and to condition said setting means for subtractive entry, and manipulative means operable with said carriage in said other position to condition said function control means for additive entry in said amount section and condition said setting means for subtractive entry.

18. An accounting machine having a totalizer comprising a line of pinions including an amount group and a counting group and provided with a transfer mechanism including for each of said pinions a transfer member, means to operate said transfer member to enter a unit on its pinion, means for each transfer member to operate it to rotate its pinion in one direction for carrying but in the opposite direction for borrowing, and for each transfer member excepting the transfer member for the pinion of lowest order of each group, means controlled by the pinion of next lower order as it rotates through its transfer point in either the adding or the subtractive direction to cause the operating means for said transfer member to operate it to rotate its pinion in the corresponding direction to carry or to borrow, function control means to condition said totalizer for entry of amounts in said amount group by rotation of pinions thereof in one direction for adding amounts and in the reverse direction for subtracting amounts, function control means to govern said totalizer for amount entry in the amount group by either adding or subtracting rotation of the pinions thereof, means operable in an amount entering operation to cause the operating means for the transfer member for the lowest order pinion of the counting group to rotate the latter pinion to enter a unit thereon and conditionable to cause said rotation of the latter pinion to be in either the carrying or borrowing direction irrespective of the adding or subtracting mode of amount entry in the amount section.

References Cited in the file of this patent
UNITED STATES PATENTS

| | | |
|---|---|---|
| 1,793,155 | Britten | Feb. 17, 1931 |
| 2,052,604 | Christian et al. | Sept. 1, 1936 |
| 2,056,536 | Sampson | Oct. 6, 1936 |
| 2,189,851 | Williams et al. | Feb. 13, 1940 |
| 2,347,607 | Muller | Apr. 25, 1944 |
| 2,626,749 | Christian et al. | Jan. 27, 1953 |
| 2,635,732 | Butler | Apr. 21, 1953 |
| 2,637,494 | Fettig | May 5, 1953 |
| 2,644,636 | Christian et al. | July 7, 1953 |
| 2,678,161 | Fleming | May 11, 1954 |
| 2,692,726 | Frieberg et al. | Oct. 26, 1954 |
| 2,723,019 | Christian et al. | Nov. 8, 1955 |